US007561933B2

(12) United States Patent
Oh et al.

(10) Patent No.: US 7,561,933 B2
(45) Date of Patent: Jul. 14, 2009

(54) APPARATUS AND METHOD FOR PROCESSING AUDIO SIGNAL AND COMPUTER READABLE RECORDING MEDIUM STORING COMPUTER PROGRAM FOR THE METHOD

(75) Inventors: Eun-mi Oh, Seoul (KR); Sang-wook Kim, Seoul (KR); Sang-jo Lee, Gyeonggi-do (KR); Mi-young Kim, Daegu-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 748 days.

(21) Appl. No.: 10/793,098

(22) Filed: Mar. 5, 2004

(65) Prior Publication Data

US 2004/0176948 A1 Sep. 9, 2004

Related U.S. Application Data

(60) Provisional application No. 60/452,534, filed on Mar. 7, 2003, provisional application No. 60/487,264, filed on Jul. 16, 2003.

(30) Foreign Application Priority Data

Feb. 27, 2004 (KR) ...................... 10-2004-0013679

(51) Int. Cl.
*G06F 17/00* (2006.01)
*G06F 15/16* (2006.01)

(52) U.S. Cl. ........................................ 700/94; 709/231

(58) Field of Classification Search ................... 700/94; 709/219, 231; 704/201, 229; 375/240
See application file for complete search history.

(56) References Cited

U.S. PATENT DOCUMENTS 6,789,123 B2 * 9/2004 Li et al. ...................... 709/231

(Continued)

FOREIGN PATENT DOCUMENTS

EP 1248431 10/2002

OTHER PUBLICATIONS

"Method for Objective Measurements of Perceived Audio Quality", ITU Radiocommunication Assembly, Recommendation ITU-R BS.1387, 1998, 1-25, Question ITU-R 210/10).

(Continued)

*Primary Examiner*—Curtis Kuntz
*Assistant Examiner*—Joseph Saunders, Jr.
(74) *Attorney, Agent, or Firm*—Buchanan Ingersoll & Rooney PC

(57) ABSTRACT

An audio signal processing apparatus and method and a computer readable recording medium storing a computer program for the method are provided. The audio signal processing apparatus includes: an input unit that receives the audio signal; and a signal processing unit that processes the audio signal received from the input unit using at least one of network information and terminal information and signal information, wherein the network information refers to information regarding the network, the status of the network varies at any time, the terminal information refers to information regarding the terminal, the status of the terminal varies at any time, and the signal information refers to information on the audio signal. The audio signal can be efficiently streamed in real-time using the network information and/or the terminal information, which vary at any time, so that the audio signal transmitted from, for example, a server side, can be seamlessly received by a terminal and can be reproduced at optimal, high sound quality by the terminal.

43 Claims, 24 Drawing Sheets

U.S. PATENT DOCUMENTS

| | | | | |
|---|---|---|---|---|
| 7,133,925 | B2 * | 11/2006 | Mukherjee et al. | 709/231 |
| 7,151,749 | B2 * | 12/2006 | Vega-Garcia et al. | 370/241.1 |
| 2002/0013812 | A1 * | 1/2002 | Krueger et al. | 709/203 |
| 2002/0143972 | A1 | 10/2002 | Christopoulos et al. | |
| 2003/0156108 | A1 * | 8/2003 | Vetro | 345/418 |

OTHER PUBLICATIONS

"Methods for the Subjective Assessment of Small Impairments in Audio Systems Including Multichannel Sound Systems", ITU Radiocommunication Assembly, Recommendation ITU-R BS.1116-1, 1994-1997, pp. 1-8, Question ITU-R 85/10.

"Selective Assessment of Sound Quality", The CCir, Recommendation 562-3, 1978-1982-1986-1990, pp. 1-2, Question 50/10, Study Programme 50C/10.

"Method for Objective Measurements of Perceived audio Quality", ITU Radiocommunicaiton Assembly, Recommentation ITU-R BS. 1387, 1998, pp. 1-25, Question ITU-R 210-10.

William C. Treurniet et al., "Evaluation of the ITU-R Objective Audio Quality Measurement Method", J. Audio Eng. Soc., 2002, pp. 164-173, vol. 48, No. 3.

"Information Technology- Multimedia Framework (MPEG-21)—Part 7,: Digital Item Adaptation", ISO/IEC JTC 1/SC 29, 2004, pp. i-ii, 1-11, ISO/IEC FDIS 21000-7:2004(E).

Ingo Wolf et al., "Experimental application of gBSDL on MPEG-4 Audio BSAC", International Organisation for Standardisation Organisation Internationale De Normallsation, ISO/IEC JTC1/SC29/WG11, Coding of Moving Pictures and Audio, 2003, pp. 1-7, MPEG03/M9529.

G. Stoll et al., "EBU Listening Tests on Internet Audio, codecs", EBU Technical Review, 2000, pp. 1-24.

Sang-Jo Lee et al., "A Real-Time Audio Streaming Method for Time-Varying Network Loads", AES 112$^{th}$ Convention, 2002, pp. 1-4, Audio Engineering Society Convention Paper, Munich, Germany.

Sang-Wook Kim et al., "Fine Grain Scalability in MPEG-4 Audio", AES 111$^{th}$ Convention, 2001, pp. 1-5, Audio Engineering society Convention Paper, New York, NY, USA.

"Subpart 4: General Audio Coding (GA)-AAC, TwinVQ, BSAC", ISO/IEC 14496-3:2001(E), 2001, pp. 1-6, and 70-87, and 306-313, ISO/IEC.

Office Action dated Aug. 29, 2008 in corresponding Chinese Application No. 2004100631344 (15 pages); and English-language translation (28 pages).

* cited by examiner

FIG. 12

```
<complexType name="AdaptionType">
    <complexContent>
      <extension base="dia:DIABaseType">
          <sequence>
            <element name="Constraint: type="dia:ConstraintType"
                     maxOccurs="unbounded"/>
            <element name="Utility" type="dia:UtilityType"/>
            <element name="AdaptationQoSData" type="dia:AdaptionQoSDataType"
                     maxOccurs="unbounded"/>
          </sequence>
          <attribute name="adaptionMethod" type="dia:adaptationMethodType"
                   use="required"/>
      </extension>
    </complexContent>
</complexType>

<complexType name="AdaptionQoSDataType">
    <complexContent>
      <extension base="dia:DIABaseType">
          <sequence>
            <element name="UtilityFunction" type="dia:UtilityFunctionType"/>
            <element name="LookUpTable" type="dia:LookUpTableType"
               minOccurs="0" maxOccurs="unbounded"/>
          </sequence>
      </extension>
    </complexContent>
</complexType>
<simpletype name="adaptionMethodType">
   <restriction base="string">
      <enumeration value="frameDroppingAndOrCoefficientDropping"/>
      <enumeration value="requantization"/>
      <enumeration value="fineGranularScalability"/>
      <enumeration value="waveletReduction"/>
      <enumeration value="spatialSizeReduction"/>
      <enumeration value="channelDropping"/>
      <enumeration value="spectralBandReduction"/>              920
      <enumeration value="audioFineGranularScalability"/>
   </restriction>
</simpletype>
```

FIG. 13

Semantics of the AdaptationType:

| *Name* | *Definition* |
|---|---|
| AdaptationType | Tool for describing the relationship between constraints, possible adaptations, and utilities (qualities) to support media resource adaptation by using a particular adaptation method. |
| Constraint | Describes the definition of constraints. |
| Utility | Describes the utility. |
| AdaptationQoSData | Groups the data of one instantiation of an UtilityFunction and possible LookUpTables. |
| UtilityFunction | Describes possible adaptation operators and associated qualities using a set of constraint points as indexes. Linear interpolation is assumed between constraint points. |
| LookUpTable | Describes additional information that does not fit in the UtilityFunction to support more elaborate adaptation scenarios. Information is described as multidimensional sets of data. |
| adaptationMethod | Describes a particular adaptation method to be used. |
| adaptationMethodType | Specifies a list of adaptation methods for media resources. The enumerated definition includes "frameDroppingAndOrCoefficientDropping", "requantization", "fineGranularScalability", "waveletReduction", and "spatialSizeReduction". These types are defined as follows:<br>• frameDroppingAndOrCoefficientDropping: adapts the incoming bitstream by dropping some parts of the incoming bitstream that correspond to specific frames and/or DCT coefficients.<br>• requantization: adapts the incoming bitstream by requantizing with a different quantization scale.<br>• fineGranularScalability: adapts the incoming ISO/IEC 14496-2 FGS bitstream by selecting the specified number of bitplanes of FGS-frames and/or FGST-frames as an enhancement layer.<br>• waveletReduction: adapts the incoming wavelet-coded bitstream by selecting the specified number of wavelet levels and bitplanes.<br>• spatialSizeReduction: adapts the incoming bitstream by reducing the spatial size (spatial resolution).<br>• channelDropping: adapts the incoming bitstream by dropping audio output channels<br>• spectralBandReduction: : adapts the incoming bitstream by reducing full audio spectral bandwidth down to the specified frequency cutoff.<br>• audioFfineGranularScalability: adapts the incoming ISO/IEC 14496-3 FGS bitstream by selecting the specified number of enhancement layers. |

922

FIG. 14

```
<complexType name="AdaptationOperatorType">
   <complexContent>
      <extension base="dia:DIABaseType">
          <sequence>
             <choice>
               <element name="FrameCoeffDropping"
                           type="dia:FrameCoeffDroppingType"/>
               <element name="FGS" type="dia:FGSType"/>
               <element name="WaveletReduction"
                           type="dia:WaveletReductionType"/>
               <element name="Requantization" type="dia:RequantizationType"/>
               <element name="SpatialSizeReduction"
                           type="dia:SpatialSizeReductionType"/>
               <element name="ChannelDropping"
                           type="dia: ChannelDroppingType"/>
               <element name="SpectralBandReduction"
                           type="dia: SpectralBandReductionType"/>
               <element name="AudioFGS" type="dia:AudioFGSType"/>
             </choice>
             <choice>
               <element name="UtilityValue" type="float"/>
               <element name="UtilityRankInformation"
                           type="dia:UtilityRankInformationType"/>
             </choice>
          </sequence>
      </extension>
   </complexContent>
</complexType>
```

924

FIG. 15

Semantics of the AdaptationOperatorType:

| *Name* | *Definition* |
|---|---|
| AdaptationOperatorType | Tool for describing a feasible adaptation operator satisfying the given constraint value in the defined adaptation method. |
| FrameCoefficientDropping | Describes an adaptation operator that is defined in the frameDroppingAndOrCoefficientDropping adaptation method. |
| FGS | Describes an adaptation operator that is defined in the fineGranularScalability adaptation method. |
| WaveletReduction | Describes an adaptation operator that is defined in the waveletReduction adaptation method. |
| Requantization | Describes an adaptation operator that is defined in the requantization adaptation method. |
| SpatialSizeReduction | Describes an adaptation operator that is defined in the spaceSizeReduction adaptation method. |
| ChannelDropping | Describes an adaptation operator that is defined in the ChannelDropping adaptation method. |
| SpectralBandReduction | Describes an adaptation operator. that is defined in the SpectralBandReduction adaptation method. |
| AudioFGS | Describes an adaptation operator that is defined in the AudioFGS adaptation method. |
| UtilityValue | Describes the quality value associated with the operator. |
| UtilityRankInformation | Describes the ranking among the feasible adaptation operators at a given constraint point in terms of quality. It represents a sense of quality in the case that the used adaptation method gives inconsistent quality values depending on the implementation of the adaptation, instead of representing a numerical value of quality using UtilityValue. |

926

FIG. 16

```
<complexType name="ChannelDroppingType">
   <complexContent>
      <extension base="dia:DIABaseType">
         <attribute name="numberOfChannels" type="nonNegativeInteger"
                     use="required"/>
         <attribute name="channelConfiguration"
                     type="dia:channelConfigurationType" use="optional"/>
      </extension>
   </complexContent>
</complexType>

<simpleType name="channelConfigurationType">
    <list itemType="nonNegativeInteger"/>
</simpleType>
```

FIG. 17

Semantics of the ChannelDroppingType:

| *Name* | *Definition* |
|---|---|
| ChannelDroppingType | Tool for describing an adaptation operator that is defined in the audio channelDropping adaptation method. The operator can be combined with other adaptation operators such as AudioFGS and SpectralBandReduction. |
| numberOfChannels | Indicates the number audio channels to be dropped. This value ranges from 1 to the maximum number of audio channels that is allowed by audio contents and audio devices. |
| channelConfiguration | Specifies the configuration of audio output channels given the number of channels to be dropped |
| channelConfigurationType | Tool for describing the configuration of audio output channels by listing the relevant audio channel numbers. For typical audio signals in a stereo or 5.1 surround format, the number is assigned to each channel as given in the table below. Numbers can be added for surround file-formats with more than 5.1 channels in future extensions. |

| Surround 5.1 | |
|---|---|
| Channel Name | Channel Number |
| Left | 1 |
| Right | 2 |
| Center | 3 |
| Left Surround (LS) | 4 |
| Right Surround (LR) | 5 |
| Low Frequency Effect (LFE) | 6 |

FIG. 18

```
<complexType name="SpectralBandReductionType">
   <complexContent>
      <extension base="dia:DIABaseType">
         <attribute name="spectralBandLimit" type="nonNegativeInteger"
                     use="required"/>
         <attribute name="numberOfChannels" type="nonNegativeInteger"
                     use="optional"/>
         <attribute name="channelConfiguration"
                     type="dia:channelConfigurationType" use="optional"/>
      </extension>
   </complexContent>
</complexType>
```

FIG. 19

Semantics of the spectralBandReduction

| *Name* | *Definition* |
| --- | --- |
| SpectralBandReductionType | Describes an adaptation operator that is defined in the spectralBandReduction adaptation method. The operator can be combined with other adaptation operator such as channelDropping. |
| spectralBandLimit | Indicates the upper limit of spectral bandwidth of an audio source in Hz. |

FIG. 20

```
<complexType name="AudioFGSType">
   <complexContent>
      <extension base="dia:DIABaseType">
         <attribute name="layersOfAudioFGS" type="dia:numberOfLayerType"
                     use="required"/>
         <attribute name="numberOfChannels" type="nonNegativeInteger"
                     use="optional"/>
         <attribute name="channelConfiguration"
                    type="dia:ChannelConfigurationType" use="optional"/>
      </extension>
   </complexContent>
</complexType>

<simpleType name="numberOfLayerType">
       <restriction base="nonNegativeInteger">
              <minInclusive value="0"/>
       </restriction>
</simpleType>
```

FIG. 21

Semantics of the AudioFGSType:

| *Name* | *Definition* |
| --- | --- |
| AudioFGSType | Tool for describing an adaptation operator that is defined in the audio fineGranularScalability adaptation method. The operator can be combined with other adaptation operator such as channelDropping and spectralBandReduction. |
| layersOfAudioFGS | Indicates the number of enhancement layers of the layered bitstream to be truncated. This value ranges from 0 to the maximum number of enhancement layers (N). A value of zero means there is no truncation providing top scalability. A value of N means all of enhancement layers are truncated from the full bitstream. The highest enhancement layers are supposed to be truncated first. |

FIG. 22

```
<DIA>
   <Description xsi:type="AdaptationQoSType">
      <Adaptation adaptationMethod="AudioFGS">
         <Constraint name="bandwidthInkbps"/>
         <Utility name="MOS"/>
         <AdaptationQoSData>
            <UtilityFunction>
               <ConstraintPoint>
                  <ConstraintValues>128</ConstraintValues>
                  <AdaptationOperator>
                     <AudioFGS layersOfAudioFGS="0"/>
                     <UtilityRankInformation utilityRank="1"
                          consistencyFlag="true"/>
                  </AdaptationOperator>
               </ConstraintPoint>
               <ConstraintPoint>
                  <ConstraintValues>90</ConstraintValues>
                  <AdaptationOperator>
                     <AudioFGS layersOfAudioFGS="19"/>
                     <UtilityRankInformation utilityRank="1"
                          consistencyFlag="true"/>
                  </AdaptationOperator>
               </ConstraintPoint>
               <ConstraintPoint>
                    <ConstraintValues>54</ConstraintValues>
                    <AdaptationOperator>
                     <AudioFGS layersOfAudioFGS="5"
                          numberOfChannels="1" channelConfiguration="L"/>
                     <UtilityRankInformation utilityRank="1"
                          consistencyFlag="true"/>
                  </AdaptationOperator>
               </ConstraintPoint>
             </UtilityFunction>
         </AdaptationQoSData>
      </Adaptation>
   </Description>
</DIA>
```

FIG. 23

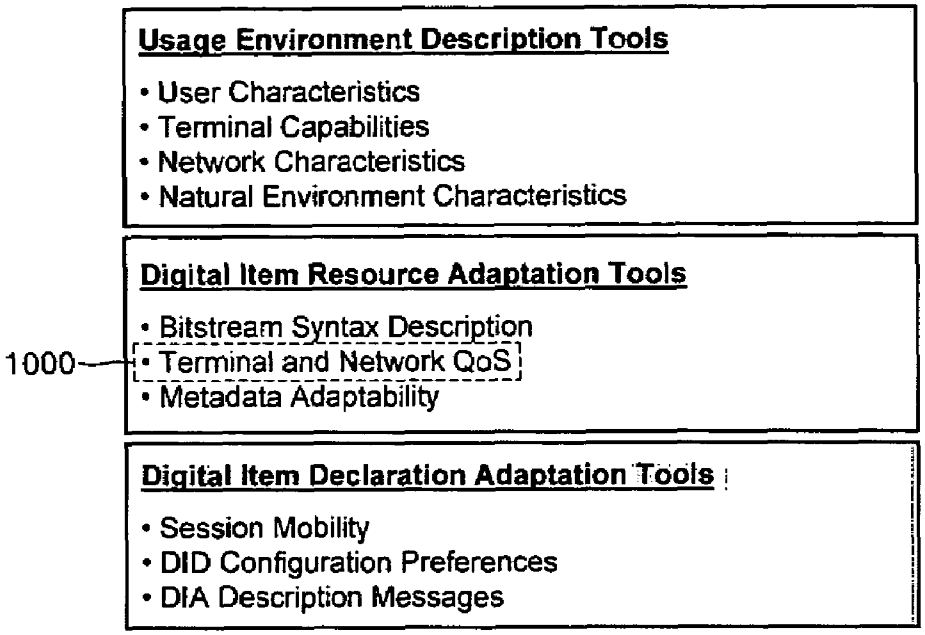

FIG. 24

```
<Term termID="3.6">
   <Name xml:lang="en">Scalable Audio</Name>
   <Definition xml:lang="en">
      Describes an adaptation operator that adapts the incoming
      Bitstream including ISO/IEC 14496-3 FGS by selecting the specified
      Number of layers.
   </Definition>
   <Term termID="3.6.1">
      <Name xml:lang="en">Layers Of Scalable Audio</Name>
      <Definition xml:lang="en">
        Indicates the number of enhancement layers to be truncated from
        the full bitstream. It is assumed that the highest enhancement
        layer is truncated first.
      </Definition>
   </Term>
</Term>
```

FIG. 25

```
<Term termID="3.7">
   <Name xml:lang="en">Channel Dropping</Name>
   <Definition xml:lang="en">
     Describes an adaptation operator that adapts the incoming resource
     by dropping audio output channels.
   </Definition>
   <Term termID="3.7.1">
     <Name xml:lang="en">Number of Channels</Name>
     <Definition xml:lang="en">
        Indicates the number audio channels to be dropped.
     </Definition>
   </Term>
   <Term termID="3.7.2">
     <Name xml:lang="en">Channel Configuration</Name>
     <Definition xml:lang="en">
        Specifies the configuration of audio output channels given the
        number of channels to be dropped.
     </Definition>
   </Term>
</Term>
```

FIG. 26

```
<Term termID="3.8">
      <Name xml:lang="en">Spectral Band Reduction</Name>
      <Definition xml:lang="en">
        Describes an adaptation operator that adapts the incoming resource
        by reducing full audio spectral bandwidth down to the specified
        frequency cutoff.
      </Definition>
      <Term termID="3.8.1">
      <Name xml:lang="en">Spectral Band Limit</Name>
      <Definition xml:lang="en">
        Indicates the upper limit of spectral bandwidth of an audio source in Hz.
      </Definition>
      </Term>
</Term>
```

FIG. 32

```
     <AdaptationQoSModule xsi:type="UtilityFunctionType">
     <Constraint xsi:type="FloatVectorType" iOPinRef="BANDWIDTH">
1200   <FloatVector>16 17 18 19 20 21 22 23 24 25 26 27 28 29 30 31 32 33 34
     35 36 37 38 39 40 41 42 43 44 45 46 47 48 49 50 51 52 53 54 55 56 57 58
     59 60 61 62 63 64 66 68 70 72 74 76 78 80 82 84 86</FloatVector>
     </Constraint>                 1300
     <AdaptationOperator xsi:type="IntegerVectorType"
     iOPinRef="LAYERS_OF_SCALABLE_AUDIO">
1202   <IntegerVector>27 26 25 24 23 22 21 20 19 18 17 16 15 14 13 12 27 27 26
     26 25 25 24 24 23 23 22 22 21 21 20 20 19 19 18 18 17 17 16 16 15 15 14
     14 13 13 12 12 11 10 9 8 7 6 5 4 3 2 1 0</IntegerVector>
     </AdaptationOperator>  1302
     <AdaptationOperator xsi:type="IntegerVectorType"
1204 iOPinRef="NUMBER_OF_CHANNELS">
       <IntegerVector>1 1 1 1 1 1 1 1 1 1 1 1 1 1 1 1 0 0 0 0 0 0 0 0 0 0 0 0 0 0 0 0 0
     0 0 0 0 0 0 0 0 0 0 0 0 0 0 0 0 0 0 0 0 0 0 0 0 0 0 0</IntegerVector>
     </AdaptationOperator>  1304
     <AdaptationOperator xsi:type="NMTokenType" iOPinRef="CHANNEL_CONFIGURATION">
1206   <NMToken>M M M M M M M M M M M M M M M M L,R L,R L,R L,R L,R L,R L,R
     L,R L,R L,R L,R L,R L,R L,R L,R L,R L,R L,R L,R L,R L,R L,R L,R L,R L,R L,R L,R
     L,R L,R L,R L,R L,R L,R L,R L,R L,R L,R L,R L,R L,R</NMToken>
     </AdaptationOperator>
                                  1306
     <Utility xsi:type="FloatVectorType" iOPinRef="ODG">
1208   <FloatVector>-3.86 -3.85 -3.84 -3.82 -3.8 -3.78 -3.74 -3.7 -3.66 -3.59 -
     3.55 -3.52 -3.46 -3.44 -3.43 -3.43 -3.63 -3.63 -3.57 -3.57 -3.44 -3.44 -3.28 -
     3.28 -3.19 -3.19 -3.11 -3.11 -2.98 -2.98 -2.94 -2.94 -2.91 -2.91 -2.86 -2.86 -
     2.88 -2.88 -2.84 -2.72 -2.72 -2.65 -2.65 -2.54 -2.54 -2.45 -2.45 -2.37 -2.22 -
     2.03 -1.91 -1.73 -1.55 -1.44 -1.28 -1.14 -1.06 -1.0 -0.42</FloatVector>
       </Utility>
     </AdaptationQoSModule>

     <IOPin semantics="urn:mpeg:mpeg21:dia:cs:AdaptationQoSCS:1.1.1"
     id="BANDWIDTH" input="true" output="false" />
     <IOPin semantics="urn:mpeg:mpeg21:dia:cs:AdaptationQoSCS:2.3" id="DI"
     input="false" output="true" />
     <IOPin semantics="urn:mpeg:mpeg21:dia:cs:AdaptationQoSCS:2.4" id="ODG"
     input="false" output="true" />
     <IOPin semantics="urn:mpeg:mpeg21:dia:cs:AdaptationQoSCS:3.6.1"
     id="LAYERS_OF_SCALABLE_AUDIO" input="false" output="true" />
     <IOPin semantics="urn:mpeg:mpeg21:dia:cs:AdaptationQoSCS:3.7.1"
     id="NUMBER_OF_CHANNELS" input="false" output="true" />
     <IOPin semantics="urn:mpeg:mpeg21:dia:cs:AdaptationQoSCS:3.7.2"
     id="CHANNEL_CONFIGURATION" input="false" output="true" />
     </AQoSRoot>
```

FIG. 34

```
<?xml version="1.0" encoding="UTF-8"?>
<gBSD xmlns="urn:mpeg:mpeg21:dia:schema:gBSD:2003"
      xmlns:bt="urn:mpeg:mpeg21:dia:schema:gBSDatatypes:2003"
      xmlns:gBSD="urn:mpeg:mpeg21:dia:schema:gBSD:2003"
      xmlns:xsi="http://www.w3.org/1999/XMLSchema-instance"
      xsi:schemaLocation="gBSD ../Schemas/gBSSchema.xsd">
   <Header>
      <ClassificationAlias alias="MA4"
           href="urn:mpeg:mpeg4:audio:cs:syntacticalLabels"/>
      <DefaultValues addressUnit="bit" addressMode="Absolute"
           globalAddressInfo="test.bsac"/>
   </Header>
<!-- ... -->
   <gBSDUnit syntacticalLabel=":MA4:BSAC:BSAC_frame_element"
           start="23528" length="2640">
      <gBSDUnit syntacticalLabel=":MA4:BSAC:BSAC_base_element"
           start="0" length="631" addressMode="Consecutive">
          <Parameter length="11"
               name=":MA4:BSAC:BSAC_base_element:framelength">
              <Value xsi:type="bt:11b">330</Value>
          </Parameter>
          <gBSDUnit syntacticalLabel="dummy1" length="5" />
          <Parameter length="6"
               name=":MA4:BSAC:BSAC_base_element:toplayer">
              <Value xsi:type="bt:6b">48</Value>
          </Parameter>
          <gBSDUnit syntacticalLabel="dummy2" length="609"/>
      </gBSDUnit>
      <gBSDUnit syntacticalLabel=":MA4:BSAC_layer_element"
              length="2009" marker="bitrate" addressMode="Consecutive">
         <gBSDUnit length="35" marker="el1"/>
         <gBSDUnit length="35" marker="el2"/>
         <gBSDUnit length="35" marker="el3"/>
         <gBSDUnit length="35" marker="el4"/>
         <gBSDUnit length="35" marker="el5"/>
         <gBSDUnit length="35" marker="el6"/>
         <gBSDUnit length="35" marker="el7"/>
         <gBSDUnit length="35" marker="el8"/>
         <gBSDUnit length="35" marker="el9"/>
         <gBSDUnit length="16" marker="el10"/>
         <gBSDUnit length="32" marker="el11"/>
         <gBSDUnit length="16" marker="el12"/>
         <gBSDUnit length="32" marker="el13"/>
         <gBSDUnit length="16" marker="el14"/>
         <gBSDUnit length="16" marker="el15"/>
         <gBSDUnit length="32" marker="el16"/>
         <gBSDUnit length="16" marker="el17"/>
         <gBSDUnit length="32" marker="el18"/>
         <gBSDUnit length="16" marker="el19"/>
         <gBSDUnit length="32" marker="el20"/>
         <gBSDUnit length="16" marker="el21"/>
         <gBSDUnit length="32" marker="el22"/>
         <gBSDUnit length="16" marker="el23"/>
         <gBSDUnit length="32" marker="el24"/>
         <gBSDUnit length="16" marker="el25"/>
         <gBSDUnit length="16" marker="el26"/>
         <gBSDUnit length="32" marker="el27"/>
         <gBSDUnit length="16" marker="el28"/>
         <gBSDUnit length="32" marker="el29"/>
         <gBSDUnit length="16" marker="el30"/>
         <gBSDUnit length="32" marker="el31"/>
         <gBSDUnit length="16" marker="el32"/>
         <gBSDUnit length="32" marker="el33"/>
         <gBSDUnit length="16" marker="el34"/>
         <gBSDUnit length="32" marker="el35"/>
         <gBSDUnit length="16" marker="el36"/>
         <gBSDUnit length="16" marker="el37"/>
         <gBSDUnit length="32" marker="el38"/>
         <gBSDUnit length="16" marker="el39"/>
         <gBSDUnit length="32" marker="el40"/>
         <gBSDUnit length="16" marker="el41"/>
         <gBSDUnit length="32" marker="el42"/>
         <gBSDUnit length="16" marker="el43"/>
         <gBSDUnit length="32" marker="el44"/>
         <gBSDUnit length="16" marker="el45"/>
         <gBSDUnit length="16" marker="el46"/>
         <gBSDUnit length="32" marker="el47"/>
         <gBSDUnit length="814" marker="el48"/>
      </gBSDUnit>
   </gBSDUnit>

<!-- ... -->

</gBSD>
```

FIG. 35

```
<?xml version="1.0" encoding="UTF-8"?>
<gBSD xmlns="urn:mpeg:mpeg21:dia:schema:gBSD:2003"
      xmlns:bt="urn:mpeg:mpeg21:dia:schema:gBSDatatypes:2003"
      xmlns:gBSD="urn:mpeg:mpeg21:dia:schema:gBSD:2003"
      xmlns:xsi="http://www.w3.org/1999/XMLSchema-instance"
      xsi:schemaLocation="gBSD ./Schemas/gBSSchema.xsd">
      <Header>
      <ClassificationAlias alias="MA4"
                href="urn:mpeg:mpeg4:audio:cs:syntacticalLabels"/>
      <DefaultValues addressUnit="bit" addressMode="Absolute"
                globalAddressInfo="test.bsac"/>
      </Header>
      <!-- ... -->
      <gBSDUnit syntacticalLabel=":MA4:BSAC:BSAC_frame_element"
             start="18280" length="2656">
      <gBSDUnit syntacticalLabel=":MA4:BSAC:BSAC_base_element"
                 length="571" addressMode="Consecutive">
          <Parameter length="11"
                 name=":MA4:BSAC:BSAC_base_element:framelength" >
              <Value xsi:type="bt:11b">332</Value>
          </Parameter>
          <gBSDUnit syntacticalLabel="dummy1" length="5"/>
              <Parameter length="6"
                     name=":MA4:BSAC:BSAC_base_element:toplayer">
                  <Value xsi:type="bt:6b">48</Value>
              </Parameter>
          <gBSDUnit syntacticalLabel="dummy2" length="549"/>
      </gBSDUnit>
      <gBSDUnit syntacticalLabel=":MA4:BSAC_layer_element"
               length="2085" marker="bitrate" addressMode="Consecutive">
      <!--here follows the information about the layer lengths of
            the enhancement-sublayers :: valid against the DIA-Schema-->
         <Parameter name=":MA4:BSAC:BSAC_base_element:layer_info">
            <Value xsi:type="String">
48,32,32,32,32,33,33,23,33,33,33,31,48,32,32,32,32,33,33,23,33,33,33,31,
48,32,32,32,32,33,33,23,33,33,33,31,48,32,32,32,32,33,33,23,33,33,33,31
                 </Value>
        </Parameter>
      </gBSDUnit>
      </gBSDUnit>
</gBSD>
```

APPARATUS AND METHOD FOR PROCESSING AUDIO SIGNAL AND COMPUTER READABLE RECORDING MEDIUM STORING COMPUTER PROGRAM FOR THE METHOD

This application claims the benefit of U.S. Patent Provisional Application No. 60/452,534, filed on Mar. 7, 2003, and No. 60,487,264, filed on Jul. 16, 2003, in the U.S. Patent Trademark Office, and the priority of Korean Patent Application No. 2004-13679, filed on Feb. 27, 2004, in the Korean Intellectual Property Office, the disclosures of which are incorporated herein in their entirety by reference.

BACKGROUND OF THE INVENTION

1. Field of the Invention

The present invention relates to an audio signal processing apparatus or software and a service system for supplying an audio signal by wire or wirelessly, and more particularly, to an apparatus and method for processing an audio signal to be streamed and a computer readable recording medium storing a computer program for the method.

2. Description of the Related Art

Real-time multimedia streaming is required in wired or wireless portable devices, Internet-based Music On Demand (MOD) or Audio On Demand (AOD) services. In such an environment where streaming is required, when an amount of data of an audio signal to be transmitted from a server (not shown) to a terminal (not shown) is greater than the allowable bandwidth of a network (not shown) connected to the terminal, problems such as a packet delay or loss arise with a conventional audio signal processing method due to the buffering of a router and congestion.

In the conventional audio signal processing method, audio signals were processed in an environment where streaming is required not considering the conditions of the terminal, such as the capability or the type of the terminal. For example, regardless of whether the terminal is a personal computer (PC) or a personal digital assistant (PDA), audio signals were streamed at the same bitrate.

In other words, in the above-described conventional audio signal processing method, audio signals are streamed at the same bitrate regardless of both the bitrates of the audio signals and the types of terminals. As a result, the problems of a packet delay and loss or a delay in the processing speed of the terminal arise, lowering the sound quality of audio signals reproduced by the terminal.

Therefore, a method of providing an adaptive quality of a service is required for service quality enhancement.

SUMMARY OF THE INVENTION

The present invention provides an audio signal processing apparatus that can stream an audio signal by processing it to be suitable for the physical environments of a terminal reproducing the audio signal and/or a network connected to the terminal.

The present invention provides an audio signal processing method in which an audio signal can be streamed by a process suitable for the physical environments of a terminal reproducing the audio signal and/or a network connected to the terminal.

The present invention provides a computer readable recording medium storing a computer program for controlling an audio signal processing apparatus that can stream an audio signal by processing it to be suitable for the physical environments of a terminal reproducing the audio signal and/or a network connected to the terminal.

According to an aspect of the present invention, there is provided an apparatus for processing an audio signal to be reproduced in a terminal connected to a network, the apparatus comprising; an input unit that receives the audio signal; and a signal processing unit that processes the audio signal received from the input unit using at least one of network information and terminal information and signal information, wherein the network information refers to information regarding the network, the status of the network varies at any time, the terminal information refers to information regarding the terminal, the status of the terminal varies at any time, and the signal information refers to information on the audio signal.

According to another aspect of the present invention, there is provided a method of processing an audio signal to be reproduced in a terminal connected to a network, the method comprising: receiving the audio signal; and processing the audio signal using at least one of network information and terminal information and signal information, wherein the network information refers to information regarding the network, the status of the network varies at any time, the terminal information refers to information regarding the terminal, the status of the terminal varies at any time, and the signal information refers to information on the audio signal.

According to another aspect of the present invention, there is provided a computer readable recording medium storing at least one computer program for controlling an apparatus according to a process to be applied to an audio signal to be reproduced in a terminal connected to a network, wherein the process comprises: receiving the audio signal; and processing the audio signal using at least one of network information and terminal information and signal information, wherein the network information refers to information regarding the network, the status of the network varies at any time, the terminal information refers to information regarding the terminal, the status of the terminal varies at any time, and the signal information refers to information on the audio signal.

BRIEF DESCRIPTION OF THE DRAWINGS

The above and other features and advantages of the present invention will become more apparent by describing in detail exemplary embodiments thereof with reference to the attached drawings in which:

FIG. 12 illustrates an embodiment of a syntax used in the audio signal processing method according to the present invention;

FIG. 13 illustrates an embodiment of semantics used in the audio signal processing method according to the present invention;

FIG. 14 illustrates another embodiment of a syntax used in the audio signal processing method according to the present invention;

FIG. 15 illustrates another embodiment of semantics used in the audio signal processing method according to the present invention;

FIG. 16 illustrates an embodiment of a syntax used when performing a number-of-channels adjusting process according to the present invention;

FIG. 17 illustrates another embodiment of semantics used when performing the number-of-channels adjusting process according to the present invention;

FIG. 18 illustrates an embodiment of a syntax is used when performing a band reducing process according to the present invention;

FIG. 19 illustrates an embodiment of semantics used when performing the band reducing process according to the present invention;

FIG. 20 illustrates an embodiment of a syntax used when performing a data selecting process according to the present invention;

FIG. 21 illustrates an embodiment of semantics used when performing the data selecting process according to the present invention;

FIG. 22 illustrates an embodiment of the number-of-channels adjusting process according to the present invention;

FIG. 23 illustrates an organization of MPEG-21 DIA tools;

FIG. 24 illustrates exemplary contents of the data selecting process;

FIG. 25 illustrates exemplary contents of the number-of-channels adjusting process;

FIG. 26 illustrates exemplary contents of the band reducing process;

FIG. 32 illustrates an embodiment of a table according to the present invention, which is expressed in XML;

FIG. 34 illustrates an embodiment of a general bitstream description (gBSD) on a bit sliced arithmetic coding (BSAC) stream; and FIG. 35 illustrates another embodiment of a gBSD on a BSAC stream.

DETAILED DESCRIPTION OF THE INVENTION

The structure and operation of an audio signal processing apparatus according to the present invention will be described in the following embodiments with reference to the appended drawings.

Figure 1:
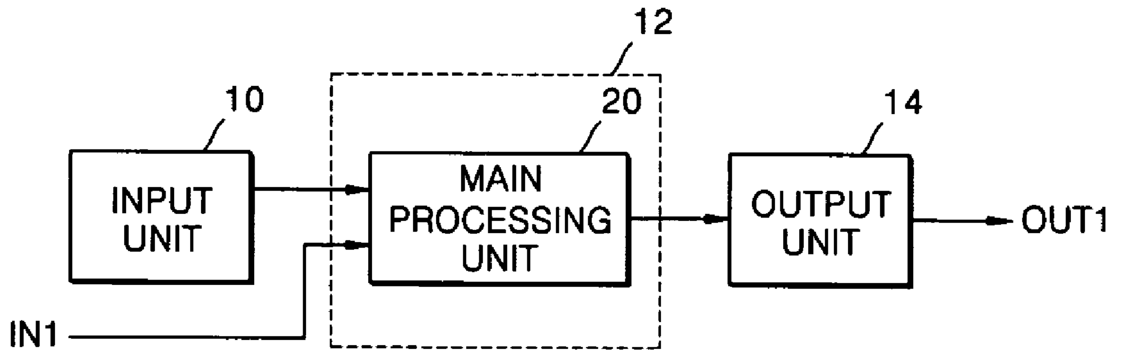
FIG. 1 is a block diagram of an audio signal processing apparatus according to the present invention.

FIG. 1 is a block diagram of an audio signal processing apparatus according to the present invention, which includes an input unit 10, a signal processing unit 12, and an output unit 14.

The audio signal processing apparatus shown in FIG. 1 processes an audio signal to be reproduced in a terminal connected to a network (not shown). The status of the network connected to the terminal is not constant and varies at any time. The status of the terminal also varies at any time, like the network.

According to an embodiment of the present invention, the audio signal processing apparatus shown in FIG. 1 may be included in a server side (not shown), which streams the audio signal toward the terminal. Here, the server side may include a server (not shown).

In another embodiment of the present invention, the audio signal processing apparatus shown in FIG. 1 may be included in the terminal.

In another embodiment of the present invention, the audio signal processing apparatus shown in FIG. 1 may be included in each of the server side and the terminal.

The input unit 10 shown in FIG. 1 receives the audio signal and outputs it to the signal processing unit 12.

The signal processing unit 12 receives the audio signal output from the input unit 10 and receives at least one of network information and terminal information through an input port IN1. The signal processing unit 12 processes the audio signal using signal information and at least one of the received network information and terminal information, and outputs the processed result. Here, the network information and the terminal information may be provided from the terminal. The signal processing unit 12 may receive the signal information from the input unit 10 or may generate the signal information from the audio signal received from the input unit 10.

According to the present invention, the above-described network information, which refers to information regarding the network, may include information on the status of the network. For example, the network information may include at least one of an available bandwidth of the network, the static capabilities of the network, and the time-varying conditions of the network. The available bandwidth of the network may continually vary depending on the number of users connected to the network through paths.

With the assumption that CDMA2000 1x is used as the network, an average available bandwidth with respect to varying speed of a vehicle can be measured using a network monitoring program.

Figure 2:
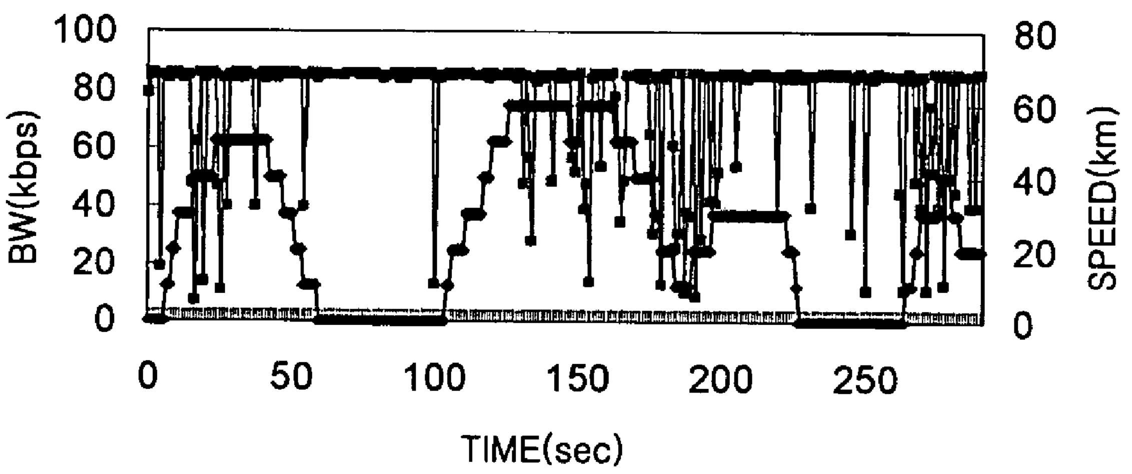
FIG. 2 is an exemplary graph illustrating available bandwidths of a network.

FIG. 2 is an exemplary graph illustrating available bandwidths of a network, in which the X-axis denotes time in seconds, and the Y-axis denotes available bandwidth (BW) of the network in kbps (kilo bit per second), expressed by ■, and the speed of a vehicle in km per hour, expressed by □.

The above-described average available bandwidth (BW) may vary as illustrated in FIG. 2.

The above-described static capabilities of a network may refer to the maximum bandwidth of the network expressed in bits/sec. The time-varying conditions of the network may refer to a one-way packet delay difference between successive packets, a packet loss rate of a particular channel, etc. For example, the packet loss rate may range from “0” to “1”. When a packet loss rate is 0, it means that there is no packet loss. When a packet loss rate is 1, it means that all packets are lost.

Meanwhile, the terminal information, which refers to information on the terminal, may include at least one of the capabilities of the terminal, the type of the terminal, and the status of the terminal. For example, the terminal information may include at least one of the allowable bitrate, a computation time, power, storage characteristics, and a type of the terminal. The allowable bitrate of the terminal, in kbps, refers the amount of data that can be received by the terminal. The computation time of the terminal may refer to the processing capability of, for example, a central processing unit (CPU) installed in the terminal. Information regarding the power of the terminal may include average power consumption of the terminal in Amperes per hour. The storage characteristics of the terminal may include the storage capacity of the terminal, measured in Mbytes. The type of the terminal may include information regarding whether, for example, the type of the terminal is a personal computer (PC) or a personal digital assistant (PDA).

A conventional method of measuring the above-described terminal information and network information is disclosed in U.S. Patent Publication No. 2003/0083870, entitled “System and Method of Network Adaptive Real-time Multimedia Streaming”.

Meanwhile, the above-described signal information, which refers to information on an audio signal, may include information on the bitrate or the type of the audio signal. A high bitrate of an audio signal means that there is a large amount of data to be streamed. The type of an audio signal refers to an attribute of the audio signal, i.e., whether the audio signal is news or a piece of popular music or classical music, whether the audio signal is a mono signal, a stereo signal, or a multi-channel signal, etc.

The output unit 14 streams the audio signal processed by the signal processing unit 12 through an output port OUT1. The output unit 14 may store and reproduce the audio signal processed by the signal processing unit 12.

The above-described audio signal processing apparatus according to the present invention may be implemented, in various forms, for example, only with the input unit 10 and the signal processing unit 12. For example, when the audio signal processing apparatus is included in the terminal, the audio signal processing apparatus of FIG. 1 may be implemented only with the input unit 10 and the signal processing unit 12.

In an embodiment of the present invention, the signal processing unit 12 shown in FIG. 1 may be implemented with a main processing unit 20. The main processing unit 10 processes the audio signal using at least one of a number-of-channels adjusting process, a data selecting process, and a band reducing process according to at least one of the network information and terminal information input through the input port IN1 and outputs the processed result to the output unit 14.

According to the present invention, the data selecting process refers to a process by which the main processing unit 20 selects a part of data included in the audio signal received from the input unit 10. For example, when a bitrate of the audio signal received from the input unit 10 is greater than an allowable bitrate or an available bandwidth, the main processing unit 20 truncates enhancement data of the audio signal. The enhancement data of the audio signal is truncated because the enhancement data contain more significant data than non-enhancement data. The main processing unit 20 may truncate the enhancement data of the audio signal received from the input unit 10 according to the bitrate of the audio signal. According to the present invention, when performing the data selecting process, the enhancement data may be truncated in units of bits or in units of layers. According to the present invention, a maximum amount of enhancement data that can be truncated from the input audio signal may be predetermined. The audio signal output from the input unit 10 may include information on the maximum amount of the enhancement data that can be truncated.

According to the present invention, the above-described band reducing process refers to a process by which the main processing unit 20 discards a high frequency component of the audio signal received from the input unit 10. For example, when a bitrate of the audio signal received from the input unit 10 is greater than an allowable bitrate or an available bandwidth, the high frequency component of the audio signal is discarded by the main processing unit 20. The high frequency component of the audio signal is discarded because the human hearing system is less sensitive to high-frequency component variations. The main processing unit 20 may discard the high frequency component of the audio signal received from the input unit 10 according to the bitrate of the audio signal. According to the present invention, a maximum amount of the high frequency component of the audio signal that can be discarded may be predetermined. The audio signal output from the input unit 10 may include information on the maximum amount of the high frequency component that can be discarded.

According to the present invention, the number-of-channels adjusting process refers to a process by which the main processing unit 20 adjusts the number of channels of the audio signal received from the input unit 10. Here, the audio signal may be transmitted from the input unit 10 to the signal processing unit 12 in a stereophonic mode, a monophonic mode, or a multi-channel mode such as 5.1 surround mode. For example, when a bitrate of the audio signal received from the input unit 10 is greater than an allowable bitrate or an available bandwidth, the main processing unit 20 drops one or more channels of the audio signals. Meanwhile, when a bitrate of the audio signal received from the input unit 10 is smaller than an allowable bitrate or an available bitrate, the main processing unit 20 adds one or more channels of the audio signal. As such, the main processing unit 20 may drop or add the number of channels of the audio signal received from the input unit 10 depending on the bitrate of the input audio signal. Here, according to the present invention, at least one of a maximum number of channels that can be dropped or added, channel numbers, and/or a channel configuration may be predetermined. The audio signal output from the input unit 10 may include such information, i.e., on the maximum number of channels that can be dropped or added and/or channel numbers, and a channel configuration. The channel configuration indicates whether the channel to be dropped or added is a right channel, a left channel, or a surround channel.

A larger amount of data can be truncated using the number-of-channel adjusting process than by the data selecting process or the band reducing process. Therefore, the main processing unit 20 may perform the number-of-channel adjusting process when a bitrate of the audio ratio is very large and may perform the data selecting process and/or the band reducing process when a bitrate of the audio signal is not large.

For example, when a bitrate of the audio signal received from the input unit 10 is equal to an allowable bitrate or an available bitrate, the main processing unit 20 may output the audio signal to the output unit 14 without performing any process on the audio signal, such as a data selecting process, a band reducing process, and a number-of-channels adjusting process. The output unit 14 streams the entire audio signal received through the main processing unit 20 of the signal processing unit 12 from the input unit 10 through the output port OUT1. When the audio signal processing apparatus of FIG. 1 is installed in the server side, the output unit 14 streams the audio signal toward the terminal.

The audio signal input to the signal processing unit 12 from the input unit 10 shown in FIG. 1 may be a compressed audio signal or a non-compressed audio signal. A compressed audio signal may undergo transformation in units of frames prior to be compressed. For example, the compressed audio signal may be a bitstream providing the functionality of scalability, such as an MPEG-4 BSAC (Bit Sliced Arithmetic Coding) bitstream with fine grain scalability (FGS), or an MPEG-4 AAC (Advanced Audio Coding) scalable bitstream. BSAC is described in detail in ISO/IEC 14495-3:2001. For example, the non-compressed audio signal may include PCM (Pulse Coding Modulation) data or wave data.

The signal processing unit 12 shown in FIG. 1 performs a data selecting process only when the input audio signal is a compressed bitstream. However, the signal processing unit 12 may perform a number-of-channels adjusting process or a band reducing process on both a compressed audio signal and a non-compressed audio signal.

Figure 3:
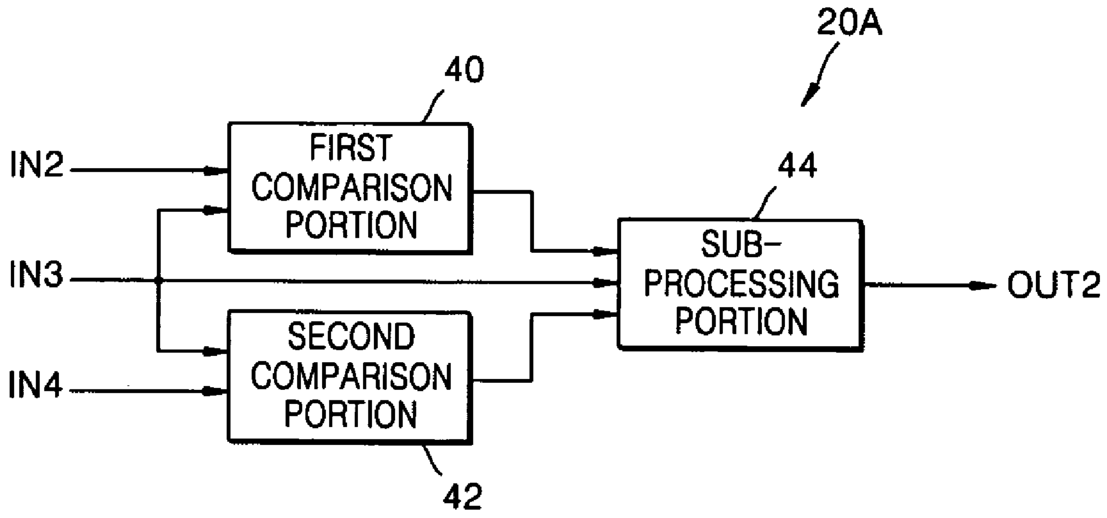
FIG. 3 is a block diagram of a main processing unit shown in FIG. 1 according to an embodiment of the present invention.

FIG. 3 is a block diagram of an embodiment 20A of the main processing unit 20 shown in FIG. 1 according to the present invention, which include a first comparison portion 40, a second comparison portion 42, and a sub-processing portion 44.

The first comparison portion 40 shown in FIG. 3 receives the network information through an input port IN2 and the signal information through an input port IN3, compares the received network information and signal information, and outputs the result of the comparison to the sub-processing portion 44.

The second comparison portion 42 receives the signal information through an input port IN3 and terminal information through an input port IN4, compares the received signal information and terminal information, and outputs the results of the comparison to the sub-processing portion 44.

The sub-processing portion 44 processes the audio signal received through the input port IN3 from the input unit 10 in response to the results of the comparisons performed in the first and second comparison portions 40 and 42, and outputs the processed result to the output unit 14 through an output port OUT2. For example, the sub-processing portion 44 performs at least one of the number-of-channels adjusting process, the data selecting process, and the band reducing process on the audio signal in response to the results of the comparisons performed in the first and second comparison portions 40 and 42.

Figure 4:
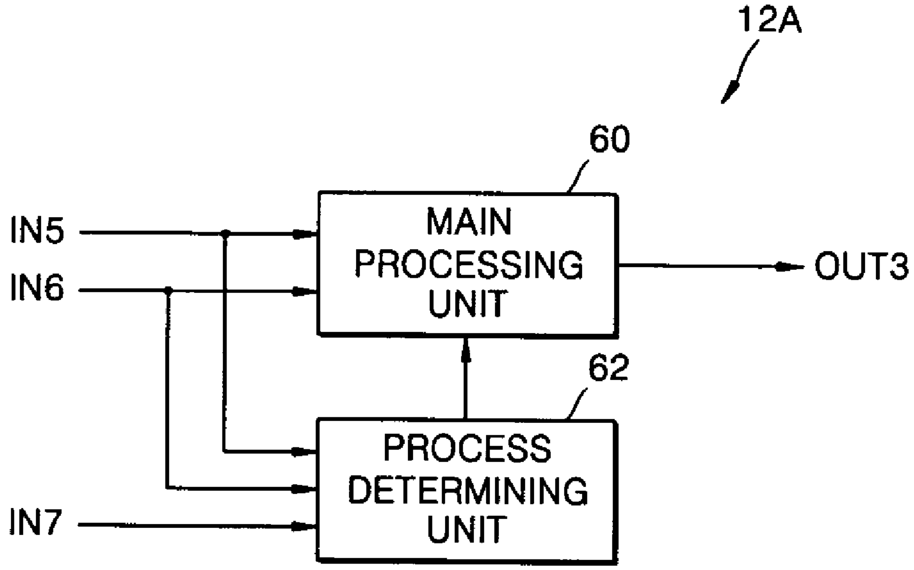
FIG. 4 is a block diagram of a signal processing unit shown in FIG. 1 according to an embodiment of the present invention.

FIG. 4 is a block diagram of another embodiment 12A of the signal processing unit 12 shown in FIG. 1 according to the present invention, which includes a main processing unit 60 and a process determining unit 62.

In the embodiment 12A according to the present invention, the main processing portion 60 shown in FIG. 4 receives at least one of the network information and the terminal information through an input port IN5 and the audio signal and/or the signal information through an input port IN6. The main processing unit 60 performs a number-of-channels adjusting process, a data selecting process, or a band reducing process on the audio signal according to the result of a determination performed in the process determining unit 62, and outputs the processed result to the output unit 14 through an output port OUT3.

The main processing unit 20 shown in FIG. 1 independently determines a type of a process to be applied to the audio signal according to at least one of the network information and the terminal information and processes the audio signal using the determined process. However, the main processing unit 60 shown in FIG. 4 processes the audio signal using the process determined in the process determining unit 62. Except for this difference, the main processing unit 60 shown in FIG. 4 is the same as the main processing unit 20 shown in FIG. 1. Therefore, the main processing unit 60 may be implemented as illustrated in FIG. 3. In case the main processing unit 60 is implemented as illustrated in FIG. 3, if the sub-processing unit 44 perceives using the results of the comparisons performed in the first and second comparison portions 40 and 42 that the audio signal should be processed using at least one process among the number-of-channels adjusting process, the data selecting process, and the band reducing process. The sub-processing unit 44 processes the audio signal using the process determined by the process determining unit 62.

The process determining unit 62 shown in FIG. 4 determines a process to be performed among the number-of-channels adjusting process, the data selecting process, and the band reducing process according to at least one of the network information and the terminal information input through the input port IN5 and outputs the determined result to the main processing unit 60.

In an embodiment of the present invention, the process determining unit 62 may determine a process that enables the terminal to reproduce a highest quality audio signal, among the number-of-channels adjusting process, the data selecting process, and the band reducing process.

In another embodiment of the present invention, the process determining unit 62 may determine a process among the number-of-channels adjusting process, the data selecting process, and the band reducing process according to at least one additional information included in the audio signal input from the input unit 10. Here, the additional information may include at least one of user's preference and meta data. Meta data refers to data representing attributes of basic data of an audio signal, rather than the basic data of the audio signal themselves.

In another embodiment of the present invention, the process determining unit 62 may determine a process that ensures highest-quality audio signal reproduction and meets the additional information, among the number-of-channels adjusting process, the data selecting process, and the band reducing process.

To this end, according to the present invention, the process determining unit 62 may determine a process to be applied to the audio signal using a table. In this case, the process determining unit 62 may receive a table generated outside through an input port IN7. Alternatively, the processing determining unit 62 may generate a table using at least one of the terminal information and the network information input through the input port IN5 and the audio signal input through the input port IN6.

Figure 5:
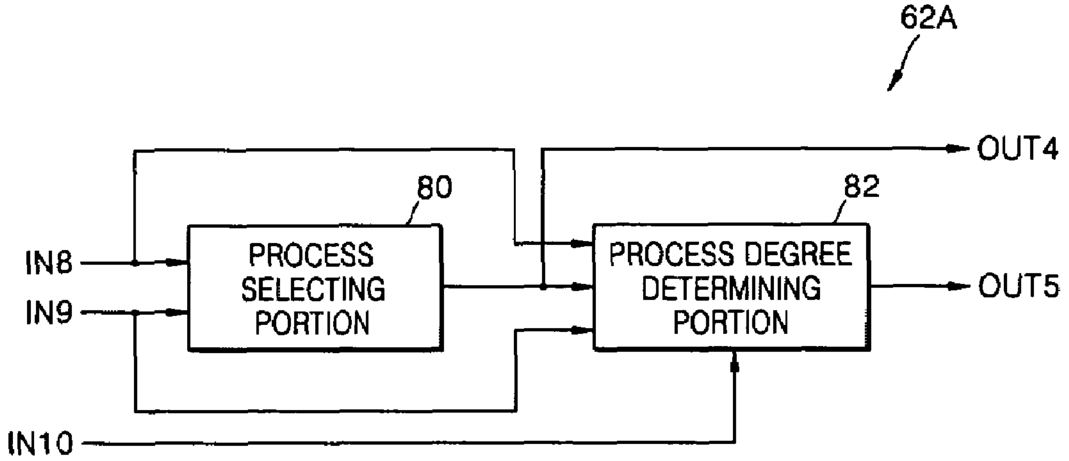
FIG. 5 is a block diagram of a process determining unit shown in FIG. 4 according to an embodiment of the present invention.

FIG. 5 is a block diagram of an embodiment 62A of the process determining unit 62 shown in FIG. 4, which includes a process selecting portion 80 and a process degree determining portion 82.

The process selecting portion 80 receives at least one of the network information and the terminal information through an input port IN8 and receives a table generated outside through an input port IN9.

In an embodiment of the present invention, in the table, at least one of the network information and the terminal information is mapped with at least one process among the number-of-channels adjusting process, the data selecting process, and the band reducing process. Accordingly, the process selecting portion 80 searches for a process corresponding to at least one of the network information and the terminal information received through the input port IN8 using the table, and outputs the searched process to the main processing unit 60 through an output port OUT4. To this end, the process selecting portion 80 may be implemented with a lookup table (not shown) containing corresponding processes as data and having addresses that are categorized according to at least one of the network information and the terminal information.

In another embodiment of the present invention, in the table, at least one of the network information and the terminal information and at least one of audio quality information and the additional information is mapped with at least one process among the number-of-channels adjusting process, the data selection process, and the band reducing process. Accordingly, the process selecting portion 80 searches for a process corresponding to at least one of the network information and terminal information input through the input port IN8 and at least one of the audio quality information and the additional information using the table, and outputs the searched process to the main processing unit 60 through the output port OUT4. To this end, the process selecting portion 80 may be implemented with a lookup table (not shown) containing corresponding processes as data and having addresses that are categorized according to at least one of the network information and the terminal information and at least one of the audio quality information and the additional information.

The main processing unit 60 receives information on the selected process output from the process selecting portion 80 through the output port OUT4 and processes the audio signal using the process perceived from the received information.

In an embodiment according to the present invention, the audio quality information, which may be included in the table, may be expressed as at least one of an objective difference grade (ODG) and a distortion index (DI). Here, the ODG and the DI may be obtained using an objective measurement method known as perceptual evaluation of audio quality (PEAQ). A large ODG or DI indicates small distortion. The PEAQ method is described in ITU-R Recommendation BS.1387. The ODG may range from −4 to 0, which corresponds to a 5-grade scale ranging from 1 to 5 according to ITU-R BS.562. The DI has the same meaning as the ODG but has an unlimited range. In general, high audio quality is expressed using the ODG, and low or intermediate audio quality is expressed using the DI. That is, a table including high audio quality information may be formed using the ODG, and a table including low or intermediate audio quality information may be formed using the DI.

According to another embodiment of the present invention, the audio quality information contained in the table may be at least one of sound brightness, sound image wideness, and sound clearness. Sound brightness is related to the frequency, for example, frequency bandwidth, of an audio signal. Sound image wideness is related to audio quality according to the position of a sound source. For example, sound image wideness is greater for a stereo mode than a mono mode. Sound clearness is related to distortion noise.

According to the present invention, sound brightness, sound image wideness, and sound cleanness may be evaluated through a subjective listening test. This subjective listening test may be a MUSHRA (Multi Stimulus test with Hidden Reference and Anchors) or ITU-R Recommendation BS.1116 when testing music. In the subjective listening test, audio quality is evaluated as a whole without classification into sound brightness, sound image wideness, and sound clearness.

According to the present invention, sound brightness and sound clearness may be separately evaluated using an objective evaluation method. This objective evaluation method may be ITU-R Recommendation BS.1387 or may be performed using MOVs (Model Output Values) with feature extraction based PEAQ. For example, in the last stage of the objective evaluation method, the basic audio quality may be expressed using ODG or DI by mapping extracted feature values, i.e., MOVs, with an overall value for the basic audio quality.

The process determining unit 62A shown in FIG. 5 may further include the process degree determining portion 82. When a process is selected in the process selecting portion 80, the process degree determining portion 82 determines a process degree using the table, which is externally input through the input port IN9, and at least one of the network information and the terminal information, which are input through the input port IN8, and outputs the determined process degree to the main processing unit 60 through an output port OUT5. Here, the process degree refers to at least one of the number of channels to be adjusted in the number-of-channels adjusting process, an amount of data to be selected from the audio signal in the data selecting process, and an amount of a high frequency component to be discarded from the audio signal in the band reducing process.

To this end, in the table input through the input port IN9, a degree of each process may be mapped with at least one of the network information and the terminal information. For example, the process degree determining portion 82 may be implemented with a lookup table (not shown) storing process degrees as data, which outputs data through the output port OUT5 to the main processing unit 60 in response to an address consisting of the process selected in the process selecting portion 80 and at least one of the network information and the terminal information, which are input through the input port IN8. Here, the main processing unit 60 processes the audio signal using the process degree determined in the process degree determining portion 82.

According to the present invention, the process degree determining portion 82 may check the type of the audio signal, determine a process degree using the checked result and the table, and may output the determined process degree to the main processing unit 60 through the output port OUT5. To this end, the process degree determining portion 82 may receive signal information that is indicative of the type of the audio signal through the input port IN10.

Figure 6:
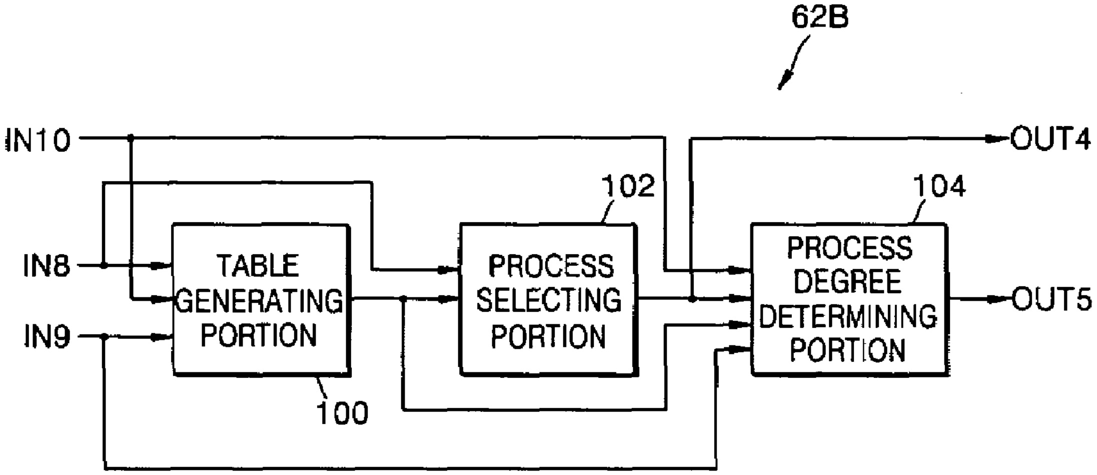
FIG. 6 is a block diagram of a process determining unit shown in FIG. 4 according to another embodiment of the present invention.

FIG. 6 is a block diagram of another embodiment 62B of the process determining unit 62 shown in FIG. 4 according to the present invention, which includes a table generating portion 100, a process selecting portion 102, a process degree determining portion 104.

Unlike the process determining unit 62A shown in FIG. 5, the process determining unit 62B shown in FIG. 6 further includes a table generating portion 100 to generate the table. Except for the inclusion of the table generating portion 100, the process determining unit 62B shown in FIG. 6 performs the same operation as the process determining unit 62A shown in FIG. 5. Accordingly, a process selecting portion 102 and a process degree determining portion 104 shown in FIG. 6 perform the same functions as the process selecting portion 80 and the process degree determining portion 82 shown in FIG. 5, respectively, and thus detailed descriptions thereon will be omitted here.

The table generating portion 100 shown in FIG. 6 generates the above-described various types of tables using at least one of the network information and the terminal information input through the input port IN8 and the audio signal input from the input unit 10 through the input port IN10, and outputs the generated tables to the process selecting portion 102. To this end, the table generating unit 100 may generate various types of tables according to, for example, ITU-R Recommendation BS.1387 using at least one of the network information and the terminal information and the audio signal.

Hereinafter, an audio signal processing method according to the present invention will now be described with reference to appended drawings.

Figure 7:
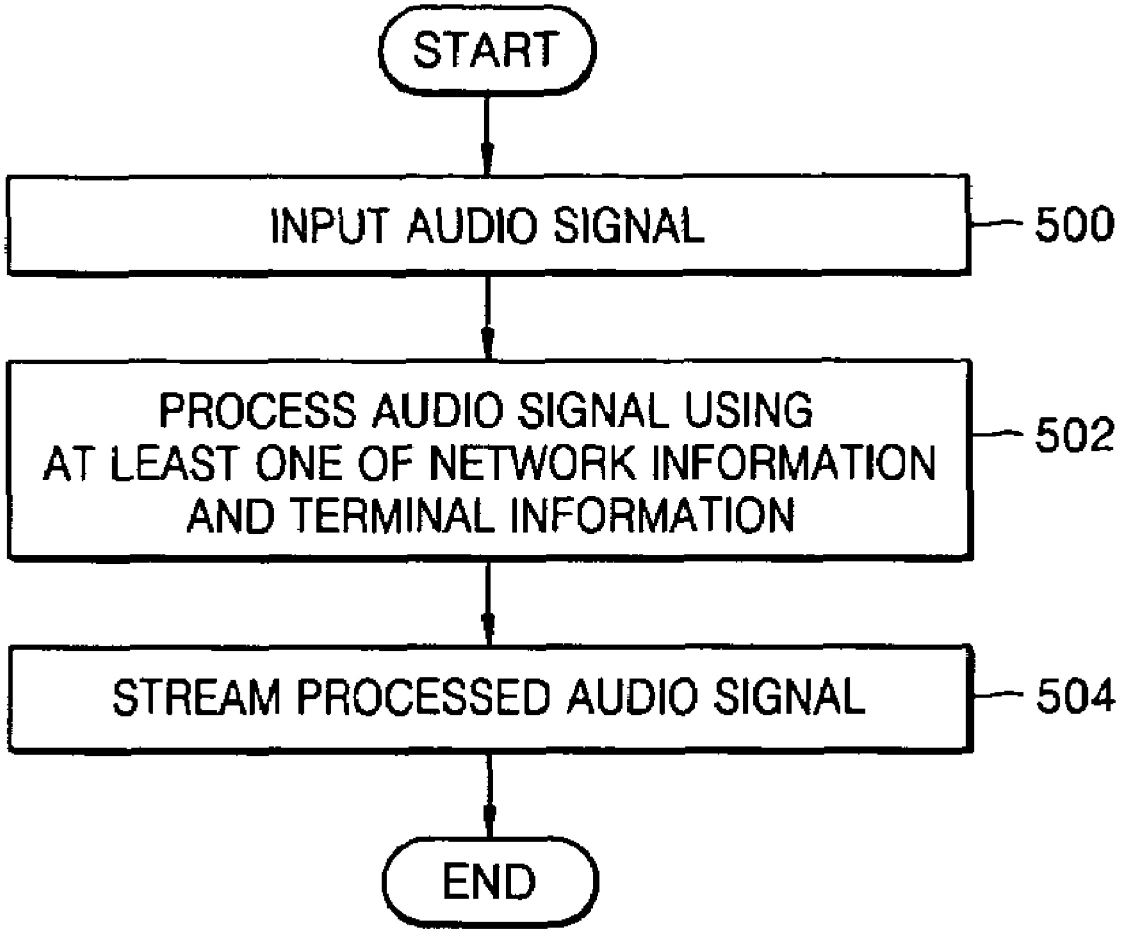
FIG. 7 is a flowchart of an audio signal processing method according to the present invention.

FIG. 7 is a flowchart illustrating an audio signal processing method according to the present invention, which includes processing an input audio signal using at least one of network information and terminal information to stream the processed audio signal (operations 500 through 504).

In the audio signal processing method according to the present invention, the audio signal is received in operation 500.

After operation 500, the audio signal is processed using at least one of the network information and the terminal information and signal information (operation 502). Here, the audio signal may be processed using at least one of a number-of-channels adjusting process, a data selecting process, a band reducing process according to at least one of the network information and the terminal information.

After Operation 502, the processed audio signal is streamed (operation 504).

Operations 500, 502, and 504 shown in FIG. 7 may be performed in the input unit 10, the signal processing unit 12, and the output unit 14 shown in FIG. 1, respectively.

The audio signal processing method illustrated in FIG. 7 may be performed in either a server side or a terminal or in both a server side and a terminal. For example, when the audio signal processing method illustrated in FIG. 7 is performed in a terminal, the audio signal processing method illustrated in FIG. 7 may be implemented with only operations 500 and 502.

With the assumption that the network information is an available bandwidth of the network, the terminal information is an allowable bitrate of the terminal, and the signal information is a bitrate of the audio signal, embodiments of Operation 502 illustrated in FIG. 7 according to the present invention will be described with reference to appended drawings.

Figure 8:
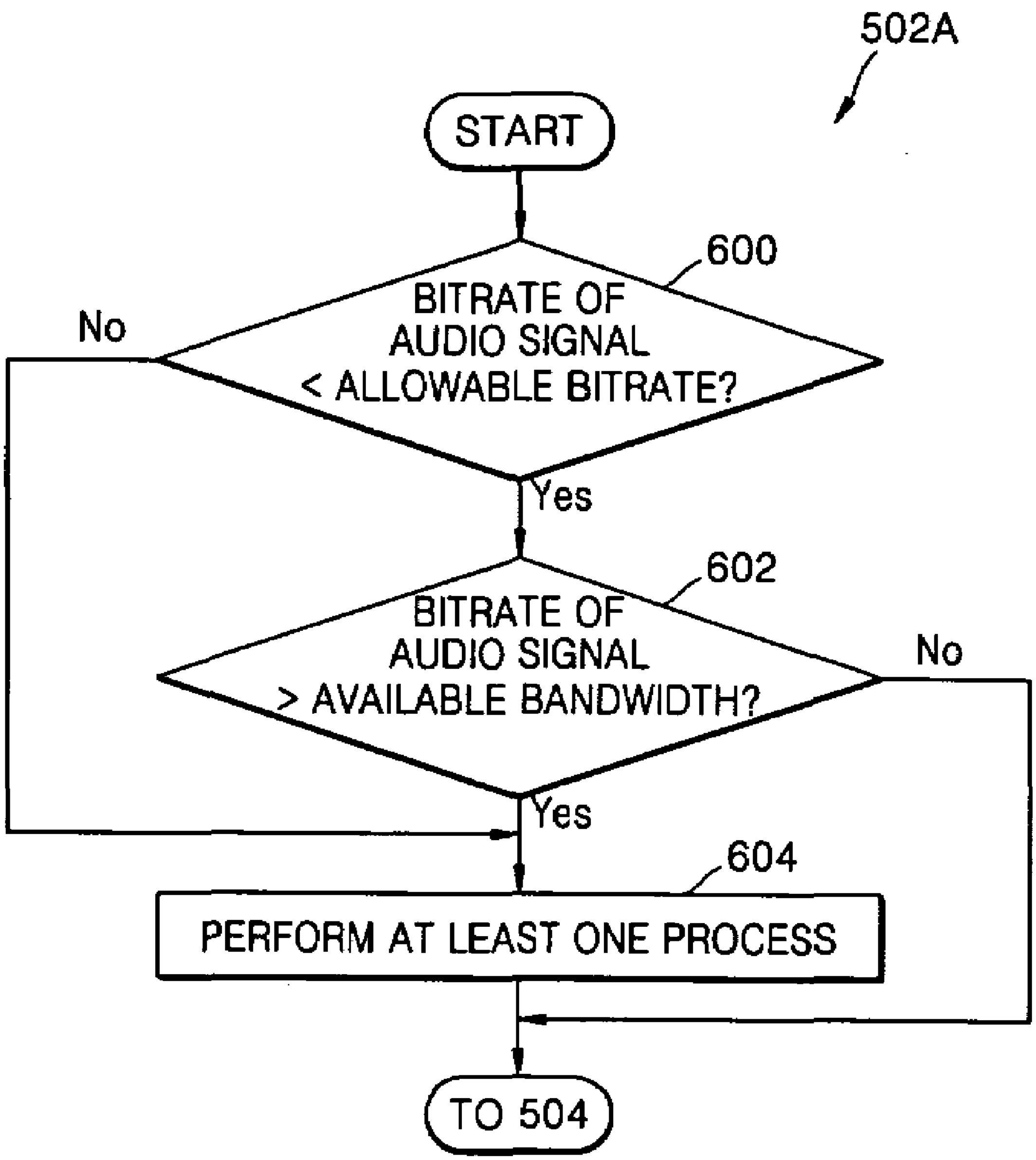
FIG. 8 is a flowchart illustrating an embodiment of operation 502 shown in FIG. 7 according to the present invention.

FIG. 8 is a flowchart illustrating an embodiment 502A of Operation 502 in FIG. 7 according to the present invention, which includes processing the audio signal using the results of comparisons between the bitrate of the audio signal, the allowable bitrate, and the available bandwidth (operations 600 through 604).

After operation 500, it is determined whether the bitrate of the audio signal is smaller than the allowable bitrate of the terminal (operation 600). If it is determined that the bitrate of the audio signal is smaller than the allowable bitrate, it is determined whether the bitrate of the audio signal is greater than the allowable bandwidth of the network (operation 602).

If it is determined that the bitrate of the audio signal is not greater than the available bandwidth of the network, the process goes to operation 504. In this case, the audio signal input in operation 500 is streamed, without performing any process on the audio signal.

However, if it is determined that the bitrate of the audio signal is not smaller than the allowable bitrate or that the bitrate of the audio signal is greater than the allowable bitrate, the audio signal is processed using at least one of the number-of-channels adjusting process, the data selecting process, and the band reducing process (operation 604).

According to the present invention, unlike the embodiment 502A of FIG. 8, operation 602 may be performed prior to operation 600. In this case, the process goes to operation 600 if it is determined that the bitrate of the audio signal is not greater than the allowable bandwidth and goes to operation 604 if it is determined that the bitrate of the audio signal is greater than the available bandwidth. Next, if it is determined in operation 600 that the bitrate of the audio signal is smaller than the allowable bitrate, the process goes to operation 504. Otherwise, if it is determined that the bitrate of the audio signal is not smaller than the allowable bitrate, the process goes to operation 604.

Operations 600 through 604 in FIG. 8 may be performed in the main processing unit 20 shown in FIG. 1 or in the main processing unit 60 shown in FIG. 4. Operations 600 through 602 may be performed in the second and first comparison portions 42 and 40, respectively. In this case, operation 604 is performed in the sub-processing portion 44 shown in FIG. 3.

Figure 9:
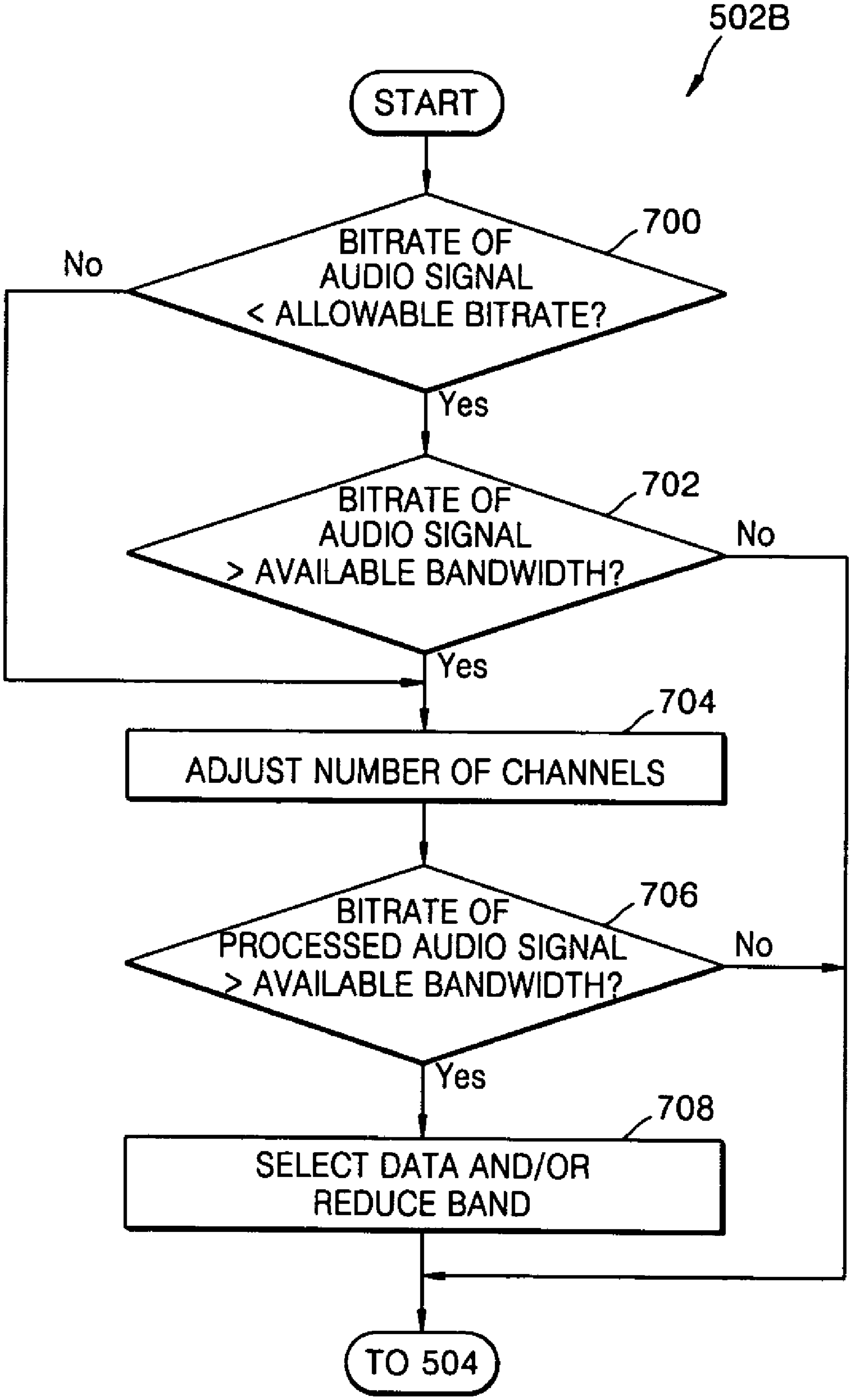
FIG. 9 is a flowchart illustrating another embodiment of operation 502 shown in FIG. 7 according to the present invention.

FIG. 9 is a flowchart illustrating an embodiment 502B of operation 502 in FIG. 7 according to the present invention, which includes processing the audio signal using the results of comparisons between the bitrate of the audio signal, the allowable bitrate, and the available bandwidth (operations 700 through 708).

Unlike the embodiment 502A illustrated in FIG. 8, in the embodiment 502B illustrated in FIG. 9, the number-of-channels adjusting operation is performed prior to the data selecting process or the band reducing process. The reason for performing the number-of-channels adjusting process prior to the data selecting process or the band reducing process lies in that, as described above, processing the audio signal using the number-of-channels adjusting process allows more data to be truncated from the audio signal than performing the audio signal using the data selecting process or the band reducing process.

After operation 500, it is determined whether the bitrate of the audio signal is smaller than the allowable bitrate of the terminal (operation 700). It is determined whether the bitrate of the audio signal is greater than the available bandwidth of the network if it is determined that the bitrate of the audio signal is smaller than the allowable bitrate (operaton 702). The number-of-channels adjusting process is performed if it is determined that the bitrate of the audio signal is greater than the available bandwidth or that the bitrate of the audio signal is not smaller than the allowable bitrate (operation 704). After operation 704, it is determined whether the bitrate of the audio signal processed using the number-of-channel-adjusting process is greater than the available bandwidth (operation 706). The audio signal is processed using at least one of the data selecting process and the band reducing process if it is determined that the bitrate of the audio signal processed using the number-of-channels adjusting process is greater than the available bitrate (operation 708).

However, if it is determined in operation 702 that the bitrate of the audio signal is not greater than the available bandwidth of the network, if it is determined in operation 706 that the bitrate of the audio signal processed using the number-of-channels adjusting process is not greater than the available bandwidth, the process goes to operation 504. In this case, the audio signal input in operation 500 is streamed, without performing any process on the audio signal (operation 504).

According to the present invention, unlike the embodiment 502B illustrated in FIG. 9, operation 702 may be performed prior to operation 700. In this case, the process goes to operation 700 if it is determined in operation 702 that the bitrate of the audio signal is not greater than the available bandwidth and goes to operation 704 if it is determined that the bitrate of the audio signal is greater than the available bandwidth. Next, if it is determined in operation 700 that the bitrate of the audio signal is smaller than the allowable bitrate, the process goes to operation 504. Otherwise, if it is determined that the bitrate of the audio signal is not smaller than the allowable bitrate, the process goes to operation 704.

Operations 700 through 708 in FIG. 9 may be performed in the main processing unit 20 shown in FIG. 1 or in the main processing unit 60 shown in FIG. 4. Operation 700 may be performed in the second comparison portion 42, and operations 702 and 706 may be performed in the first comparison portion 40. In this case, operations 704 and 706 are formed in the sub-processing unit 44 shown in FIG. 3.

Figure 10:
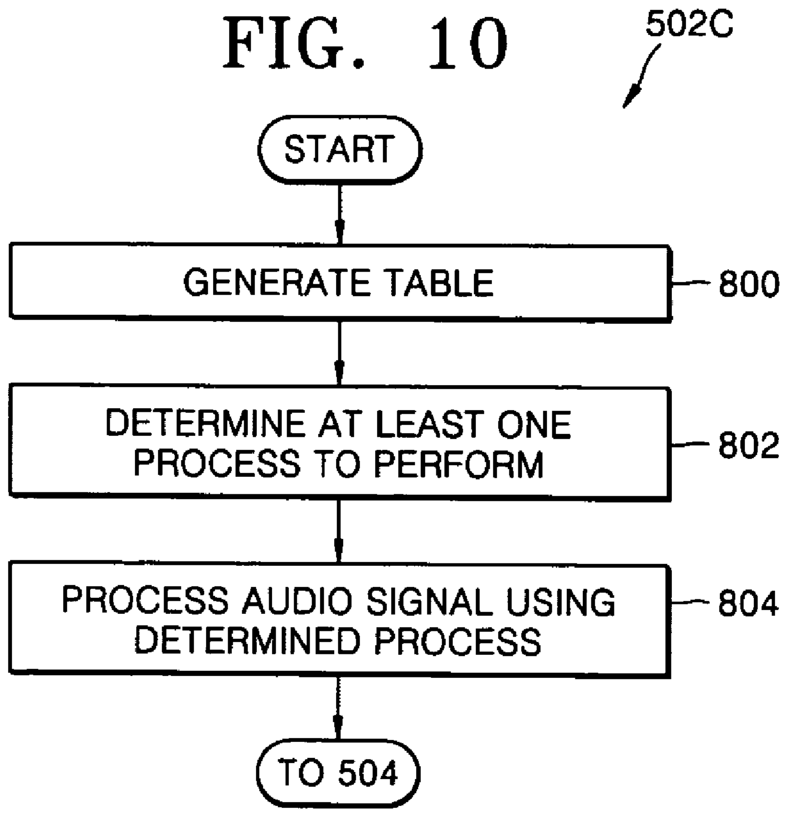
FIG. 10 is a flowchart illustrating another embodiment of operation 502 shown in FIG. 7 according to the present invention.

FIG. 10 is a flowchart illustrating another embodiment 502C of operation 502 in FIG. 7 according to the present invention, which includes processing the audio signal using a process that is determined using a table (operations 800 through 804).

First, a table as described above is generated using both the audio signal and at least one of the network information and the terminal information (operation 800). After operation 800, at least one process to be performed, among the number-of-channels adjusting process, the data selecting process, and the band reducing process, is determined using the table (operation 802). After operation 802, the audio signal is processed using the determined process (operation 804). According to the present invention, the embodiment 502C illustrated FIG. 10 may not include operation 800. In this case, a previously generated table is used.

According to the present invention, the embodiment 502C illustrated in FIG. 10 may be an embodiment of operation 604 in FIG. 8 or an embodiment of operation 708 in FIG. 9. In this case, operation 800 illustrated in FIG. 10 may be performed in the table generating portion 100 shown in FIG. 6. Operation 802 may be performed in the process determining unit 62 shown in FIG. 4, the process selecting portion 80 shown in FIG. 5, or the processing type selecting portion 102 shown in FIG. 6. Operation 804 may be performed in the main processing unit 60 shown in FIG. 4.

Figure 11:
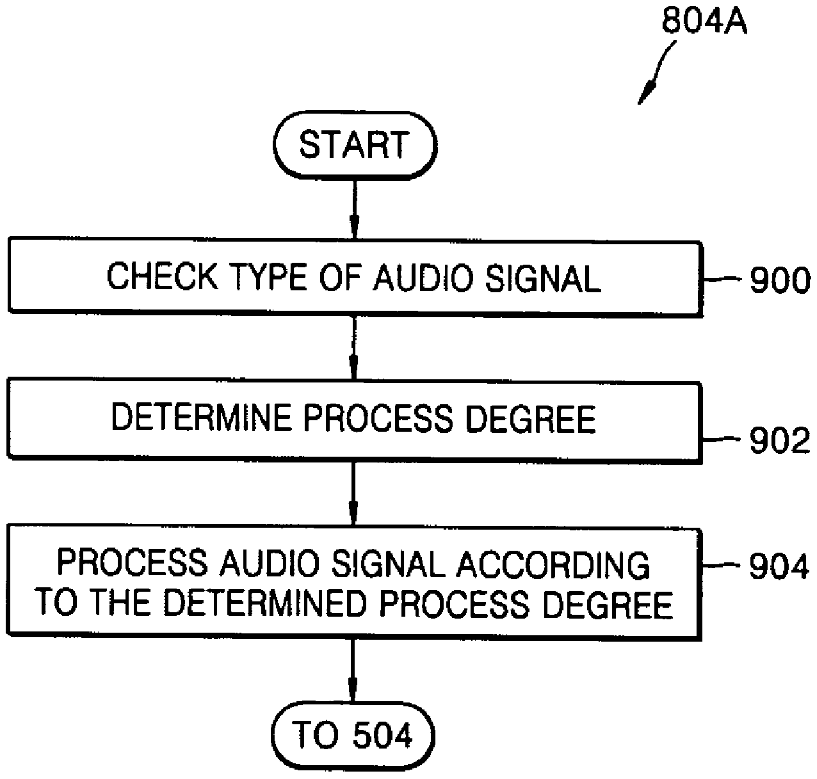
FIG. 11 is a flowchart illustrating an embodiment of operation 804 shown in FIG. 10 according to the present invention.

FIG. 11 is a flowchart illustrating an embodiment 804A of operation 804 in FIG. 10 according to the present invention, which includes determining a process degree according to the type of the audio signal (operations 900 through 904).

After operation 802, the type of the audio signal is checked using the signal information (operation 900). After operation 900, the process degree is determined as described above using the checked result and the table (operation 902). After operation 902, the audio signal is processed according to the determined process degree, and the process goes to operation 504 (operation 904). Here, operations 900 and 902 illustrated in FIG. 11 may be performed in the process degree determining portion 82 shown in FIG. 5 or in the process degree determining portion 104 shown in FIG. 6. Operation 904 may be performed in the main processing unit 60 shown in FIG. 4.

Hereinafter, a computer readable recording medium storing a computer program according to the present invention will be described.

A computer readable recording medium according to the present invention, which stores at least one computer program for controlling the above-describe audio signal processing apparatus for processing an audio signal to be reproduced by a terminal connected to a network, stores a computer program for receiving the audio signal and processing the audio signal using at least one of the network information and the terminal information and the signal information. The computer program stored in the computer readable recording medium may cause a computer to effect streaming the processed audio signal.

Here, processing the audio signal may include determining at least one process to be performed, among the number-of-channels adjusting process, the data selecting process, and the band reducing process, according to at least one of the network information and the terminal information, and processing the audio signal using the determined process.

In an embodiment of the present invention, processing the audio signal may include determining whether the bitrate of the audio signal is smaller than the bitrate of the terminal, which corresponds to a kind of terminal information, determining whether the bitrate of the audio signal is greater than the available bandwidth of the network if it is determined that the bit rate of the audio signal is smaller than the allowable bitrate, and performing at least one of the number-of-channels adjusting process, the data selecting process, and the band reducing process if it is determined that the bitrate of the audio signal is not smaller than the allowable bitrate or that the bitrate of the audio signal is greater than the available bandwidth.

In another embodiment of the present invention, processing the audio signal may include determining whether the bit rate of the audio signal is smaller than the allowable bitrate of the terminal, determining whether the bitrate of the audio signal is greater than the available bandwidth of the network if it is determined that the bitrate of the audio signal is smaller than the allowable bitrate, performing the number-of-channels adjusting process if it is determined that the bitrate of the audio signal is greater than the available bandwidth or that the bitrate of the audio signal is not smaller the allowable bitrate, determining whether the bitrate of the audio signal processed using the number-of-channels adjusting process is greater than the available bandwidth, and performing at least one of the data selecting process and the band reducing process if it is determined that the bitrate of the audio signal processed using the number-of-channels adjusting process is greater than the available bandwidth.

Alternatively, processing the audio signal may include determining at least one process among the number-of-channels adjusting process, the data selecting process, and the band reducing process using the table and processing the audio signal using the determined process. Here, processing the audio signal may further include generating the table using at least one of the network information and the terminal information and the audio signal.

Processing the audio signal may include determining a process degree using the table and processing the audio signal according to the determined process degree. In this case, processing the audio signal may include checking the type of the audio signal, determining the process degree using the checked result and the table, and processing the audio signal according to the determined process degree.

In conclusion, an audio signal processing apparatus according to the present invention and processes performed in each element of various embodiments of the audio signal processing apparatus may be implemented using software, which is stored in a computer readable recording medium and is run to control a computer.

The above-described audio signal processing apparatus and method and the computer readable recording medium therefor according to the present invention can be applied for MPEG-21 DIA (Digital Item Adaptation).

Hereinafter, for the convenience of understanding the present invention, an exemplary application of an audio signal processing apparatus and method according to the present invention applied to MEPG-21 DIA will be described with reference to appended drawings, in which the number-of-channels adjusting process is denoted as “ChannelDropping”, the data selecting process as “audioFGS”, and the band reducing process as “spectralBandReduction”.

FIGS. 12 through 21 illustrate embodiments of syntax and sematics in a language used in MPEG-21 for audio adaptation.

In FIGS. 12 through 21, boxed portions 920, 922, 924, and 926 were lead by the audio signal processing apparatus and method according to the present invention. For example, when an audio signal is transmitted in a 5.1 surround mode, channel number may be allocated to each channel as illustrated in FIG. 17. However, the present invention is not limited to this mode and can be applied to a 5.1 or greater multi-channel mode. In this case, the number-of-channels adjusting process may be implemented as attributes of the data selecting process and the band reducing process.

FIG. 22 illustrates an embodiment of the number-of-channels adjusting process according to the present invention.

The number-of-channels adjusting process may be expressed as, for example, in FIG. 22 when it is implemented as attributes of the data selecting process. In the embodiment illustrated in FIG. 22, it is assumed that the signal processing unit 12 performs the data selecting process when the initial available bandwidth of the network is 128 kbps and reduces to, for example, 90 kbs, and performs the number-of-channels adjusting process when the available bandwidth reduces to, for example, 54 kbps.

Hereinafter, for the convenience of understanding the present invention, an exemplary application of an audio signal processing apparatus and method according to the present invention applied to MEPG-21 DIA will be described with reference to appended drawings, in which the number-of-channels adjusting process is denoted as “ChannelDropping”, the data selecting process as “ScalableAudio”, and the band reducing process as “SpectralBandReduction”.

FIG. 23 illustrates an organization of tools for MPEG-21 DIA. As illustrated in FIG. 23, there are three kinds of MPEG-21 DIA tools. In the organization illustrated in FIG. 23, an audio signal processing apparatus and method according to the present invention may be applied to provide Terminal and Nnetwork QoS (Quality of Service) 1000.

FIG. 24 illustrates the contents of a data selecting process adopted in “Study of ISO/IEC 21000-7 FCD-Part 7: Digital Item Adaptation, ISO/IEC JTC1/SC29/WG11/N5933, represented in October 2003 in Brisbane, Austria, and “ISO/IEC 21000-7 FDIS-Part 7: Digital Item Adaptation, Adaptation QoS Typeification Scheme of ISO/IEC JTC1/SC29WG11/N6168, represented in December 2003 in Hawaii. In FIG. 24, “termID” represents term IDs according to a classification scheme.

When the network information is the available bandwidth of the network, measured in kbps, the terminal information is the computation time of the terminal, measured in milliseconds, and sound quality is expressed as a signal-to-noise ratio using a mean opinion score (MOS), the data selecting process performed in the signal processing unit 12 may be expressed as illustrated in FIG. 24.

FIG. 25 illustrates the contents of a number-of-channels adjusting process adopted in “Study of ISO/IEC 21000-7 FCD-Part 7: Digital Item Adaptation, ISO/IEC JTC1/SC29/WG11/N5933, represented in October 2003 in Brisbane, Austria, and ”ISO/IEC 21000-7 FDIS-Part 7: Digital Item Adaptation, Adaptation QoS Classification Scheme of ISO/IEC JTC1/SC29/WG11/N6168, represented in December 2003 in Hawaii.

For example, when an audio signal is transmitted in a 5.1 surround mode and the terminal supports only a stereo mode, the number of channels to be dropped may be set to 4 using the number-of-channels adjusting process performed in the signal processing unit 12, and the type of the channel may be set to be a left channel, designated by “L”, a right channel, designated by “R, or a surround channel, designated by “S”. On the other hand, when an audio signal is transmitted in a stereo mode, the number of channels to be dropped may be set to “1” and the type of the channel may be set to be a mono channel, represented by “M”. The number-of-channel adjusting process may be expressed as in FIG. 25.

FIG. 26 illustrates the contents of a band reducing process adopted in “Study of ISO/IEC 21000-7 FCD-Part 7: Digital Item Adaptation, ISO/IEC JTC1/SC29/WG11/N5933, represented in October 2003 in Brisbane, Austria, and “ISO/IEC 21000-7 FDIS-Part 7: Digital Item Adaptation, Adaptation QoS Classification Scheme of ISO/IEC JTC1/SC29/WG11/N6168, represented in December 2003 in Hawaii. For example, the band reducing process may be expressed as in FIG. 26.

Hereinafter, embodiments of the above-described tables that may be used in an audio signal processing apparatus and method and a computer readable recording medium therefor according to the present invention will be described with reference to appended drawings, with the assumption that the network is CDMA2000 1x.

Figure 27:
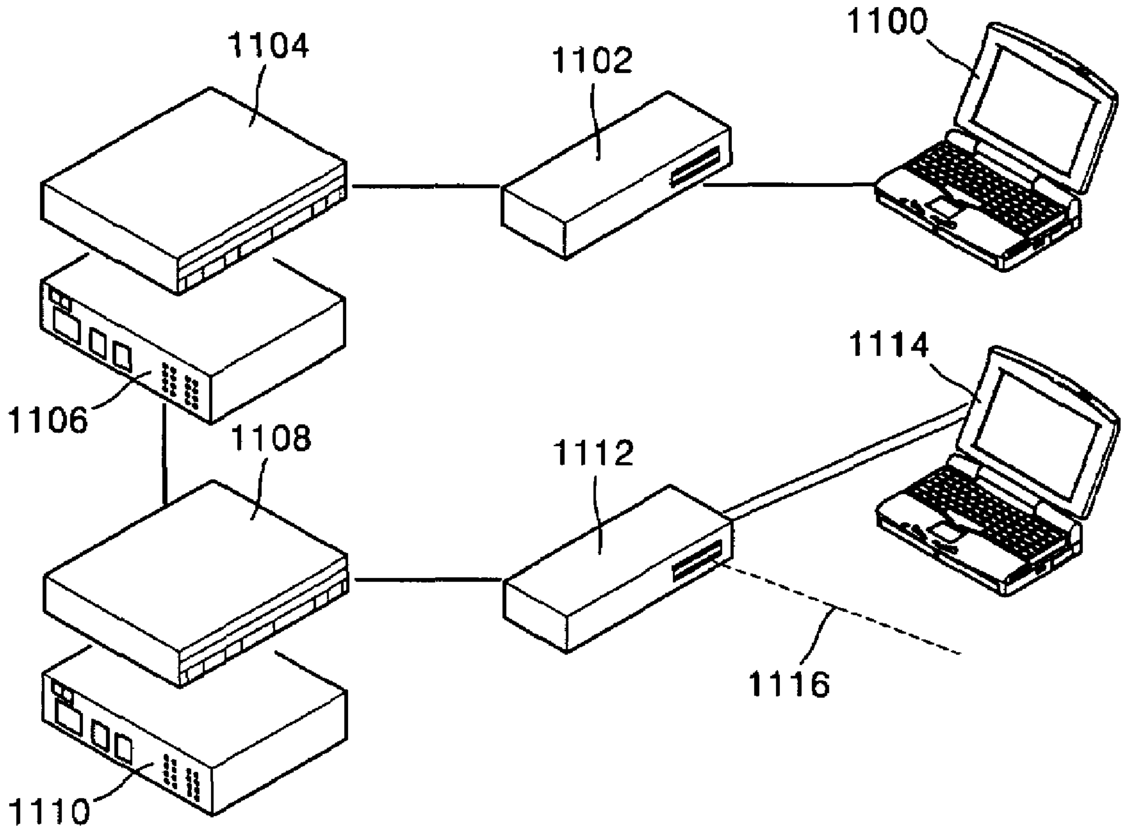
FIG. 27 illustrates an appearance of a general streaming system.

FIG. 27 illustrates a configuration of a general streaming system, which includes a server 1100, switching hubs 1102 and 1112, routers 1104 and 1108, controllers 1106 and 1110, a terminal 1114, and a network 1116.

The server 1100 shown in FIG. 27 may include the signal processing apparatus shown in FIG. 1. The terminal 1114 is connected to the network 1116 by the switching hub 1112. Here, it is assumed that the server 1100 generates dummy packets and transmits them to the terminal 1114 when the network 1116 has an available bandwidth as illustrated in FIG. 2, that the bitrates of the dummy packets vary from 4 kbps to 86 kbps, that an audio signal processed using the data selecting process in the server 1100 is a MPEG-4 BSAC bitstream, and that an audio signal not processed using the data selecting process is an MPEG-4 AAC bitstream. It is also assumed that there are three kinds of audio signals: popular music, news, and classical music. It is also assumed that a top layer of the BSAC bitstream is made to provide a maximum available bandwidth of the network CDMA2000 1x, for example, of 86 kbps per channel, lower layers of the BSAC stream may provide the functionality of fine grain scalability (FGS) with a step size of 1 kbps per channel, and the MC stream is encoded at 86 kbps.

In this case, although the available bandwidth varies over time, the BSAC bitstream can be streamed without having a buffering period of time when reproduced in the terminal 1114. However, frequent interrupts occurs in the MC bitstream. Seamless data reproduction using the data selecting process performed in the signal processing unit 12 can be achieved at the sacrifice of sound quality.

Figure 28:
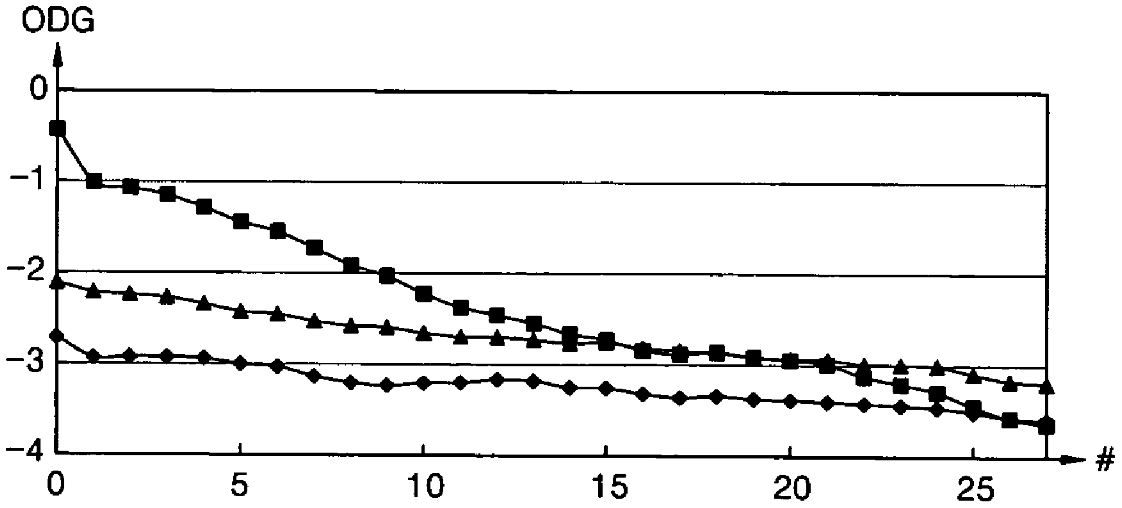
FIG. 28 is a graphical illustration of a table including sound quality information expressed using an objective difference grade (ODG) according to an embodiment of the present invention.
Figure 29:
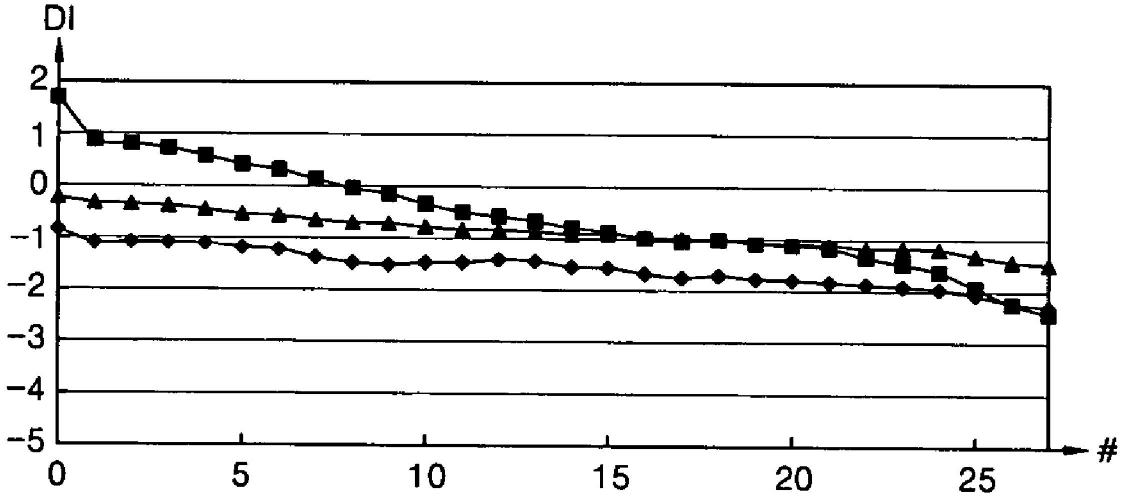
FIG. 29 is a graphical illustration of a table including sound quality information expressed using a distortion index (DI) according to another embodiment of the present invention.

FIG. 28 is a graphical illustration of a table including sound quality information expressed using an objective difference grade (ODG), according to an embodiment of the present invention. In FIG. 28, the horizontal axis represents the number (#) of layers truncated using the data selecting process, and the vertical axis represents the ODG. FIG. 29 is a graphical illustration of a table including sound quality information expressed using a distortion index (DI), according to an embodiment of the present invention. In FIG. 29, the horizontal axis represents the number (#) of layers truncated using the data selecting process, and the vertical axis represents the DI. In FIGS. 28 and 29, ■ denotes a news audio signal, □ denotes a popular music audio signal, and ▲ denotes a classical music audio signal.

The graphs of FIGS. 28 and 29 are considered to be a kind of tables. For example, a table that can be expressed as the graph of FIG. 28 or 29 may store at least one of the network information and the terminal information, sound quality information expressed as the ODG and/or DI, and the number (#) of layers to be truncated by the data selecting process, which are matched with each other. The process degree determining portion 82 of FIG. 5 or the process degree determining portion 104 of FIG. 6 may determine a process degree to the audio signal using the graph of FIG. 28 or 29. For example, when the data selecting process is determined as a process to be applied to the audio signal in the process selecting portion 80 or 102 of the process determining unit 62, the process degree determining portion 82 or 104 receives at least one of the network information and the terminal information through the input port IN8 and searches an ODG value in the table of FIG. 28 or a DI value in the table of FIG. 29, which corresponds to the sound quality mapped with at least one of the received network information and terminal information. Here, the process degree determining portion 82 or 104 also searches as a process degree the number (#) of layers to be truncated in the table of FIG. 28 or 29, which matches the searched ODG value or DI value.

The main processing unit 60 discards enhancement layer of the audio signal according to the process degree determined in the process degree determining portion 82 or 104. When the process degree determining portion 82 or 104 determines the process degree, the type of the audio signal, i.e., whether the audio signal is news, popular music, or classical music, may be considered.

Figure 30:
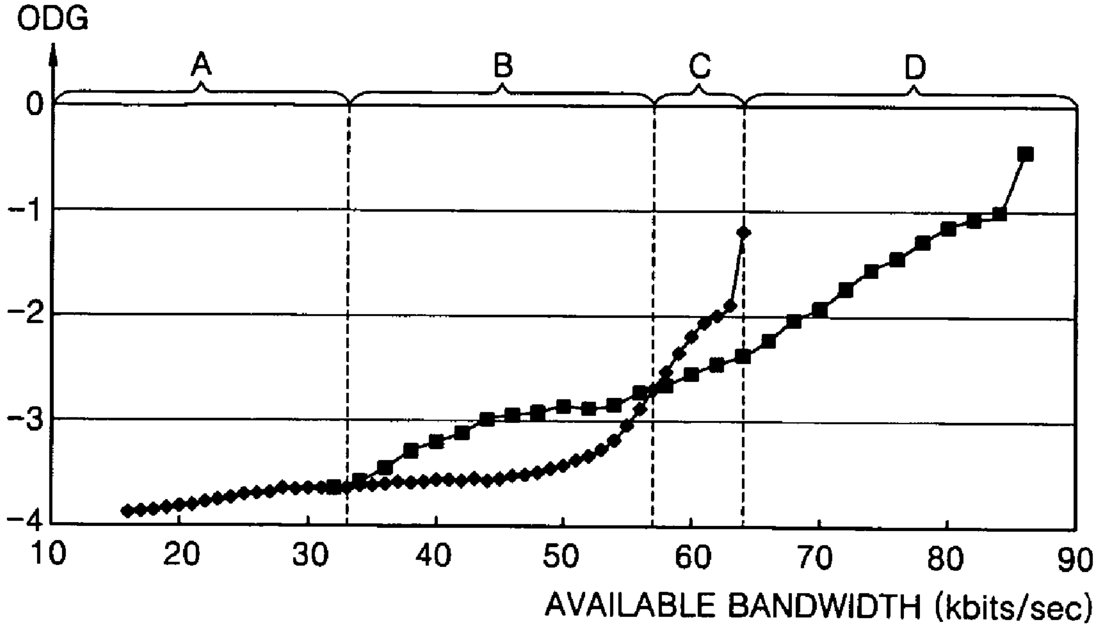
FIG. 30 is a graphical illustration of a table including sound quality information of news, which is expressed using the ODG according to another embodiment of the present invention.

FIG. 30 is a graphical illustration of a table including sound quality information of news expressed using an ODG, according to an embodiment of the present invention. In FIG. 30, the horizontal axis represents the available bandwidth of the network in kbps, and the vertical axis represents the ODG.

Figure 31:
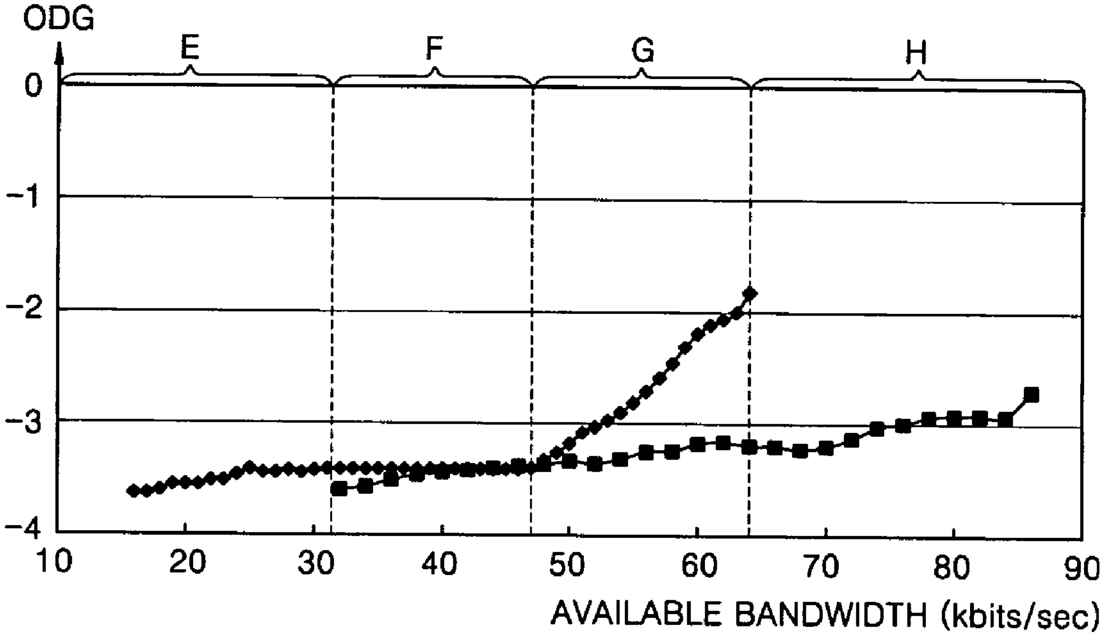
FIG. 31 is a graphical illustration of a table including sound quality information of a piece of popular music, which is expressed using the ODG according to another embodiment of the present invention.

FIG. 31 is a graphical illustration of a table including sound quality information of a piece of popular music expressed using an ODG, according to an embodiment of the present invention. In FIG. 31, the horizontal axis represents the available bandwidth of the network in kbps, and the vertical axis represents the ODG.

In FIGS. 30 and 31, sound quality that is expected when the signal processing unit 12 processes the audio signal only using the data selecting process is denoted by ■, sound quality that is expected when the signal processing unit 12 processes the audio signal using both of the data selecting process and the number-of-channels adjusting process is denoted by □.

The graphs of FIGS. 30 and 31 are considered to be a kind of tables. For example, a table that can be expressed as the graph of FIG. 30 or 31 may store the available bandwidth, which corresponds to the network information, the type of the audio signal, which corresponds to the signal information, and sound quality information expressed using the OSG, which are matched with each other. The process determining unit 62 shown in FIG. 4 may determine the type of a process to be applied to the audio signal using the graph of FIG. 30 or 31. Here, the process determining unit 62 may receives a table corresponding to the graph of FIG. 30 and/or FIG. 31 through the input port IN7 or may generate a table corresponding to the graph of FIG. 30 and/or FIG. 31 using at least one of the network information and the terminal information, which are input through the input port IN5, and the audio signal input through the input port IN6.

Initially, the process determining unit 62 determines whether the audio signal is news or popular music using the signal information received through the input port IN6. If it is determined that the audio signal is news, the process determining unit 62 may determine the type of a process to be applied to the audio signal using the graph of FIG. 30. However, if it is determined that the audio signal is popular music, the process determining unit 62 may determine the type of a process to be applied to the audio signal using the graph of FIG. 31. As such, when a graph to be referred to is determined according to the type of the audio signal, the process determining unit 62 determines whether the available bandwidth, which is the network information received through the input port IN5, belongs to which range of the available bandwidth of FIG. 30 or FIG. 31, i.e., among ranges A, B, C, and D of FIG. 30 or among ranges E, F, G, and H of FIG. 31.

If it is determined that the available bandwidth input through the input port 1N5 belongs to range A of FIG. 30 or range E of FIG. 31, in which only mark ♦ appears, the process determining unit 62 determines both the data selecting process and the number-of-channels adjusting process as processes to be applied to the audio signal. However, if it is determined that the available bandwidth input through the input port 1N5 belongs to range D of FIG. 30 or range H of FIG. 31, in which only mark ■ appears, the process determining unit 62 determines only the data selecting process as a process to be applied to the audio signal.

However, if it is determined that the available bandwidth input through the input port 1N5 belongs to range B or C of FIG. 30 or range F or G of FIG. 31, in which both marks ■ and ♦ appear, the process determining unit 62 selects one of marks ■ and ♦ with a greater ODG indicating higher sound quality. For example, when the available bandwidth belongs to range B of FIG. 30, plot ■ has a greater ODG that yields higher sound quality than plot □, so that the process determining unit 62 determines the data selecting process as a process to be applied to the audio signal. However, when the available bandwidth belongs to range C of FIG. 30 of range F or G of FIG. 31, plot ♦ has a greater ODG that yields higher sound quality than plot ■, the process determining unit 62 determines both the data selecting process and the number-of-channels adjusting process as processes to be applied to the audio signal. Next, the main processing unit 60 processes the audio signal using the process determined in the process determining unit 62.

FIG. 32 illustrates an embodiment of a table according to the present invention, which is expressed in XML used in MPEG-21. The table of FIG. 32 includes an available bandwidth (BANDWIDTH) region 1200, which is related to the network information, a data selecting process (SCALABLE_AUDIO) region 1202, number-of-channels adjusting regions 1204 and 1206, and a sound quality (Utility) region 1208.

In the available bandwidth region 1200 of FIG. 32, available bandwidth values are expressed using float vectors. In the data selecting process region 1202, the number of enhancement layer to be truncated is expressed using integer vectors. In the number-of-channels adjusting region 1204, the number of channels to be dropped is expressed using integer vectors. In the number-of-channels adjusting region 1206, the configurations of channels are expressed. In the sound quality region 1208, sound quality graded using the ODG is expressed using float vectors. Regarding the configurations of channels expressed in the number-of-channels adjusting region 1206, "M" denotes a mono channel, "L" denotes a left channel, and "R" denotes a right channel.

In the table of FIG. 32, available bandwidths, a degree of process in data selecting processes, a degree of process in number-of-channels adjusting processes, and sound quality values are one-to-one matched. For example, an available bandwidth of 16 matches a process degree of 27 in the data selecting process, as indicated by an arrow 1300, the process degree of 27 matches a value of 1, which corresponds to the number of channels to be dropped, as indicated by an arrow 1302, the value of 1, which corresponds to the number of channels to be dropped, matches a mono channel M, as indicated by an arrow 1304, and the mono channel M, which indicates a configuration of the channel, matches a sound quality value of −3.86, as indicated by an arrow 1306.

When the type of the terminal is a personal computer, enhancement layers of a BSAC bitstream having a bitrate of 64 kbps per channel are provided to the terminal, and the data processing capability, for example, computation time, of the terminal, which is provided as the terminal information, is calculated using Entrek Toolbox software, embodiments of tables that may be used to process the audio signal will be described as follows with reference to appended drawings.

Figure 33:
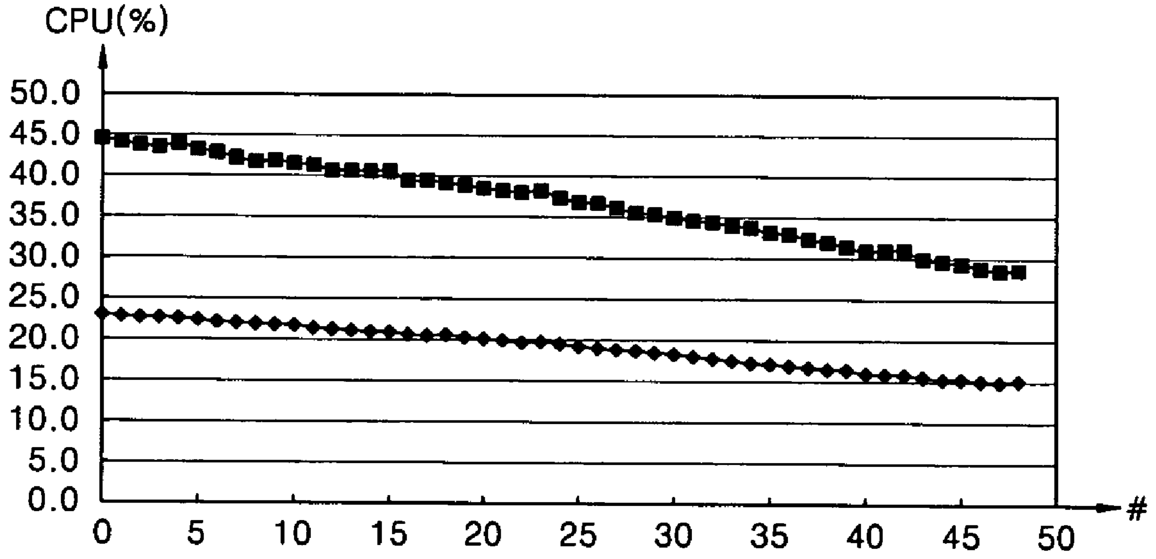
FIG. 33 is a graphical illustration of a table according to another embodiment of the present invention.

FIG. 33 is a graphical illustration of a table according to an embodiment of the present invention. In FIG. 33, the horizontal axis represents the number (#) of layers to be truncated using the data selecting process, and the vertical axis represents the percentage of data processing capability of the terminal, particularly, its computation time. ♦ denotes a mono audio signal, and ■ denotes a stereo audio signal.

The graph of FIG. 33 is considered to be a kind of table. For example, a table that can be expressed as the graph of FIG. 33 may store the computation time (CPU%) of the terminal, which corresponds to the terminal information, the type of the audio signal, which corresponds to the signal information, and the number of layers to be truncated using the data selecting process, which are matched with each other. For example, when the data selecting process is determined in the process selecting portion 80 or 102 as a process to be applied to the audio signal, the process degree determining portion 82 of FIG. 5 or the process degree determining portion 104 of FIG. 6 may determine a process degree, which corresponds to the number (#) of layers to be truncated from the audio signal, using the graph of FIG. 33. For example, the process degree determining portion 82 or 104 receives the terminal information through the input port IN8 and searches the number (#) of layers to be truncated, which is mapped with the computation time of the terminal of the received terminal information, in the table. The process degree determining portion 82 or 104 outputs the searched process degree (#) to the main processing unit 60. Next, the main processing unit 60 truncates the number of enhancement layers of the audio signal according to the process degree (#) searched by the process degree determining portion 82 or 104. In this case, when the process degree determining portion 82 or 104 determines the process degree, whether the audio signal is a mono type, a stereo type, or a multi-channel type may be considered.

Hereinafter, when the signal processing unit 12 truncates enhancement data in units of bits, not in units of layers, in the data selecting process, an audio signal processing apparatus and method and a computer readable recording medium therefor according to the present invention will be described.

According to the present invention, generic bitstream descriptions (gBSD) can be applied to an MPEG-4 BSAC audio signal. This BSAC audio signal may be processed using the data selecting process, as described above. In this case, all enhancement layers of the audio signal can be fully truncated in units of bits, but the lengths of base layers do not vary. The non-varying lengths of the layers provide significant information in a decoding process and need to be updated during the data selecting process. In addition, the compressed BSAC audio signal starts with a header, which remains unchanged when performing the data selecting process.

FIG. 34 illustrates an embodiment of gBSD on a BSAC audio signal, according to the present invention, using a language used in MPEG-21. FIG. 35 illustrates another embodiment of gBSD on a BSAC audio signal according to the present invention using a language used in MPEG-21.

Referring to FIGS. 34 or 35, it is apparent how similar the descriptions of the bitstreams are and that frames are addressed in an absolute mode and layers are addressed in a relative mode. In a subunit with a marker "bitrate", enhancement layers are listed. Therefore, enhancement layers to be truncated can be identified using the marker when the data selecting process is performed.

When a bitstream, i.e., a compressed audio signal, is processed, sampling frequency, number of channels, and window length are no longer required, and only the number and the IDs of enhancement data to be truncated in the data selecting process are required. Frames are truncated according to offsets signaled by relative sizes of enhancement layers, and parameters such as frame-size and top-layer are adapted. In this case, when enhancement data are truncated in units of bits in the data selecting process according to present invention and the boundary between a truncated bit and a non-truncated bit matches the boundary between layers, sound quality can be enhanced.

As described above, in an audio signal processing apparatus and method and a computer readable recording medium according to the present invention, an audio signal can be efficiently streamed using real-time network information and/or terminal information, which vary at any time, so that the audio signal transmitted from, for example, a server side, can be seamlessly received by a terminal and can be reproduced at optimal, high sound quality by the terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing an audio signal to be reproduced in a terminal connected to a network, the apparatus comprising;

an input unit that receives the audio signal;

a signal processing unit that receives at least one of network information and terminal information, and processes the audio signal received from the input unit using signal information and at least one of the received network information and the received terminal information; and an output unit that streams the processed audio signal, wherein the network information refers to information regarding the network, the status of the network being variable at any time, the terminal information refers to information regarding the terminal, the status of the terminal being variable at any time, and the signal information refers to information on the audio signal;

wherein the signal processing unit includes a process determining unit that determines a process to be applied to the audio signal, among a number-of-channels adjusting process, a data selecting process, and a band reducing process, according to at least one of the network information and the terminal information, and a main processing unit.

wherein the process determining unit includes a process selecting portion that selects the type of a process to be applied to the audio signal from among the number-of-channels adjusting process, the data selecting process, and the band reducing process using a table that maps at least one of the network information and the terminal information to at least one of the number-of-channels adjusting process, the data selecting process, and the band reducing process, and wherein the process determining unit further comprises a table generating portion that generates the table using at least one of the network information and the terminal information and the audio signal received from the input unit and outputs the generated table to the process selecting portion.

2. The apparatus of claim 1, wherein the network information includes information regarding the status of the network, the terminal information includes information regarding at least one of the capability, the type, and the status of the terminal, and the signal information includes information regarding a bitrate of the audio signal.

3. The apparatus of claim 2, wherein the information regarding the status of the network includes at least one of an available bandwidth of the network, the static capability of the network, and the time-varying conditions of the network;

the terminal information includes information regarding at least one of an allowable bitrate of the terminal, the data processing capability of the terminal, the power of the terminal, the storage capability of the terminal, and the type of the terminal; and the signal information further includes the type of the audio signal.

4. The apparatus of claim 1, wherein the main processing unit receives a compressed audio signal from the input unit and processes the compressed audio signal using the data selecting process.

5. The apparatus of claim 4, wherein the compressed audio signal is a bitstream with a functionality of fine grain scalability.

6. The apparatus of claim 5, wherein the compressed audio signal includes at least one of a Bit Sliced Arithmetic Coding (BSAC) bitstream and an Advanced Audio Coding Scalable (AAC) bitstream.

7. The apparatus of claim 1, wherein the main processing unit receives a compressed audio signal or an uncompressed audio signal from the input unit and processes the audio signal using the number-of-channels adjusting process and the band reducing process.

8. The apparatus of claim 1, wherein the main processing unit selects only a portion of the data in units of bits when performing the data selecting process.

9. The apparatus of claim 1, wherein the main processing unit selects a portion of the data in units of layers when performing the data selecting process.

10. The apparatus of claim 1, wherein the main processing unit comprises:

a first comparison portion that compares the signal information and the network information;

a second comparison portion that compares the signal information and the terminal information; and a sub-processing portion that processes the audio signal input through the input unit in response to the results of the comparisons performed in the first and second comparison portions.

11. The apparatus of claim 1, wherein the signal processing unit selects a non-enhancement portion as the some of the data included in the audio signal according to at least one of the network information and the terminal information when performing the data selecting process.

12. The apparatus of claim 1, wherein the signal processing unit adjusts the number of channels of the audio signals by dropping the number of channels of the audio signals according to at least one of the network information and the terminal information when performing the number-of-channels adjusting process.

13. The apparatus of claim 1 wherein the process determining unit determines a process among the number-of-channels adjusting process, the data selecting process, and the band reducing process, according to at least one of sound quality information and additional information included in the audio signal input from the input unit.

14. The apparatus of claim 13, wherein the additional information corresponds to at least one of user preference information and meta data.

15. The apparatus of claim 13, wherein the process selecting portion that selects the types of a process to be applied to the audio signal from among the number-of-channels adjusting process, the data selecting process, and the band reducing process using the table that maps at least one of the network information and the terminal information and at least one of the sound quality information and the additional information to at least one of the number-of-channels adjusting process, the data selecting process, and the band reducing process.

16. The apparatus of claim 15, wherein the table including the sound quality information is generated using at least one of an objective difference grade and a distortion index.

17. The apparatus of claim 16 wherein a table including high audio quality information is generated using the objective difference grade, and a table including low or intermediate audio quality information is generated using the distortion index.

18. The apparatus of claim 15, wherein the table including the sound quality information is generated using at least one of sound brightness, which is related to the frequency of the audio signal, sound image wideness, which is related to sound quality according to the position of a sound source, and sound clearness, which is related to distortion noise.

19. The apparatus of claim 18, wherein the sound brightness, the sound image wideness, and the sound cleanness are evaluated using a subjective listening test.

20. The apparatus of claim 19, wherein the subjective listening test is a multi-stimulus test with hidden reference and anchors.

21. The apparatus of claim 19, wherein the subjective listening test is ITU-R Recommendation BS.1116.

22. The apparatus of claim 18, wherein the sound brightness and the sound clearness are separated evaluated using an objective evaluation method.

23. The apparatus of claim 22, wherein the objective evaluation method is ITU-R Recommendation BS.1387.

24. The apparatus of claim 15, wherein the process determining unit further comprises a process degree determining portion that determines a process degree, which is at least one of the number of channels to be adjusted in the number-of-channels adjusting process, an amount of data to be selected in the data selecting process, and an amount of a high frequency component to be discarded from the audio signal in the band reducing process, using the table that maps the number of channels to be adjusted, the amount of data to be selected, and the amount of the high frequency component to be discarded to at least one of the network information and the terminal information; and the main processing unit processes the audio signal using the process degree determined in the process degree determining portion.

25. The apparatus of claim 24, wherein the process degree determining portion checks the type of the audio signal and determined the process degree using the checked result and the table.

26. The apparatus of claim 1, wherein the process determining unit further comprises a process degree determining portion that determines a process degree, which is at least one of the number of channels to be adjusted in the number-of-channels adjusting process, an amount of data to be selected in the data selecting process, and an amount of a high frequency component to be discarded from the audio signal in the band reducing process, using the table that maps the number of channels to be adjusted, the amount of data to be selected, and the amount of the high frequency component to be discarded to at least one of the network information and the terminal information; and the main processing unit processes the audio signal using the process degree determined in the process degree determining portion.

27. The apparatus of claim 1, wherein the table generation portion generates the table according to the audio signal and the at least one of the network information and the terminal information using ITU-R Recommendation BS.1387.

28. The apparatus of claim 1, being applied to MPEG-21.

29. The apparatus of claim 1, wherein when the main processing unit processes the audio signal using the number-of-channels adjusting process the main processing unit adjusts the number of channels of the audio signal, when the main processing unit processes the audio signal using the data selecting process, the main processing unit selects some of the data included in the audio signal, and when the main processing unit processes the audio signal using the band reducing process, the main processing unit discards a high frequency component of the audio signal, according to at least one of the network information and the terminal information.

30. A method of processing an audio signal to be reproduced in a terminal connected to a network, the method comprising:

receiving the audio signal;

receiving at least one of network information and terminal information, and processing the audio signal using signal information and at least one of the received network information and the received terminal information; and streaming the processed audio signal, wherein the network information refers to information regarding the network, the status of the network being variable at any time, the terminal information refers to information regarding the terminal, the status of the terminal being variable at any time, and the signal information refers to information on the audio signal; and wherein processing the audio signal comprises determining at least one process to be applied to the audio signal using a table that maps the at least one process to at least one of the network information and the terminal information and at least one of sound quality information of the terminal and additional information, and wherein processing the audio signal comprises:

determining at least one process to be applied to the audio signal among a number-of-channels adjusting process, a data selecting process, and a band reducing process, using the table;

processing the audio signal using the determined process; and generating the table using at least one of the network information and the terminal information and the audio signal, wherein, in the table, at least one of the number-of-channels adjusting process, the data selecting process, and the band reducing process is mapped with at least one of the network information and the terminal information.

31. The method of claim 30, wherein the processing of the audio signal comprises:

determining whether a bitrate of the audio signal, which corresponds to the signal information, is smaller than an allowable bitrate of the terminal, which corresponds to the terminal information;

determining whether the bitrate of the audio signal is greater than an available bandwidth of the network, which corresponds to the network information, if it is determined that the bitrate of the audio signal is smaller than the allowable bitrate; and performing at least one of the number-of-channels adjusting process, the data selecting process, and the band reducing process if it is determined that the bitrate of the audio signal is not smaller than the allowable bitrate or is greater than the available bandwidth.

32. The method of claim 30, wherein the processing of the audio signal comprises:

determining whether a bitrate of the audio signal, which corresponds to the signal information, is smaller than an available bitrate of the terminal, which corresponds to the terminal information;

determining whether the bitrate of the audio signal is greater than an available bandwidth of the network, which corresponds to the network information, if it is determined that the bitrate of the audio signal is smaller than the allowable bitrate;

performing the number-of-channels adjusting process if it is determined that the bitrate of the audio signal is greater than the available bandwidth or is not smaller than the allowable bitrate;

determining whether the bitrate of the audio signal that is processed using the number-of-channels adjusting process is greater than the available bandwidth; and performing at least one of the data selecting process and the band reducing process if it is determined that the bit rate of the audio signal processed using the number-of-channels adjusting process is greater than the available bandwidth.

33. The method of claim 30 wherein, in the table, at least one of the number-of-channels adjusting process, the data selecting process, and the band reducing process is mapped with at least one of the network information and the terminal information and at least one of sound quality information of the terminal and additional information.

34. The method of claim 30 wherein, in the table, a process degree, which is at least one of the number of channels to be adjusted in the number-of-channels adjusting process, an amount of data to be selected from the audio signal in the data selecting process, and an amount of a high frequency component of the audio signal to be discarded in the band reducing process, are mapped with at least one of the network information and the terminal information; and the processing of the audio signal comprises processing the audio signal according to a process degree.

35. The method of claim 34, wherein the processing of the audio signal comprises:

checking the type of the audio signal; determining the process degree using the checked result and the table; and processing the audio signal according to the determined process degree.

36. The method of claim 30, wherein:

the number-of-channels adjusting process includes adjusting the number of channels of the audio signal, the data selecting process includes selecting some of data included in the audio signal, and the band reducing process includes discarding a high frequency component of the audio signal, according to at least one of the network information and the terminal information.

37. A computer readable recording medium storing at least one computer program for controlling an apparatus according to a process to be applied to an audio signal to be reproduced in a terminal connected to a network, wherein the process comprises:

receiving the audio signal;

receiving at least one of network information and terminal information, and processing the audio signal using signal information and at least one of the received network information and the received terminal information; and streaming the processed audio signal, wherein the network information refers to information regarding the network, the status of the network being variable at any time, the terminal information refers to information regarding the terminal, the status of the terminal being variable at any time, and the signal information refers to information on the audio signal;

wherein processing the audio signal comprises determining at least one process to be applied to the audio signal using a table that maps the at least one process to at least one of the network information and the terminal information and at least one of sound quality information of the terminal and additional information, and wherein processing the audio signal comprises:

determining at least one process to be applied to the audio signal among a number-of-channels adjusting process, a data selecting process, and a band reducing process, using the table;

processing the audio signal using the determined process; and generating the table using the audio signal and at least one of the network information and the terminal information, wherein, in the table, at least one of the number-of-channels adjusting process, the data selecting process, and the band reducing process is mapped with at least one of the network information and the terminal information.

38. The computer readable recording medium of claim 37, wherein the processing of the audio signal comprises:

determining whether a bitrate of the audio signal, which corresponds to the signal information, is smaller than an allowable bitrate of the terminal, which corresponds to the terminal information;

determining whether the bitrate of the audio signal is greater than an available bandwidth of the network, which corresponds to the network information, if it is determined that the bitrate of the audio signal is smaller than the allowable bitrate; and performing at least one of the number-of-channels adjusting process, the data selecting process, and the band reducing process if it is determined that the bitrate of the audio signal is not smaller than the allowable bitrate or is greater than the available bandwidth.

39. The computer readable recording medium of claim 37, wherein the processing of the audio signal comprises:

determining whether a bitrate of the audio signal, which corresponds to the signal information, is smaller than an available bitrate of the terminal, which corresponds to the terminal information;

determining whether the bitrate of the audio signal is greater than an available bandwidth of the network, which corresponds to the network information, if it is determined that the bitrate of the audio signal is smaller than the allowable bitrate;

performing the number-of-channels adjusting process if it is determined that the bitrate of the audio signal is greater than the available bandwidth or is not smaller than the allowable bitrate;

determining whether the bitrate of the audio signal that is processed using the number-of-channels adjusting process is greater than the available bandwidth; and performing at least one of the data selecting process and the band reducing process if it is determined that the bit rate of the audio signal processed using the number-of-channels adjusting process is greater than the available bandwidth.

40. The computer readable recording medium of claim 37, wherein, in the table, at least one of the number-of-channels adjusting process, the data selecting process, and the band reducing process is mapped with at least one of the network information and the terminal information and at least one of sound quality information of the terminal and additional information.

41. The computer readable recording medium of claim 37, wherein, in the table, a process degree, which is at least one of the number of channels to be adjusted in the number-of-channels adjusting process, an amount of data to be selected from the audio signal in the data selecting process, and an amount of a high frequency component of the audio signal to be discarded in the band reducing process, are mapped with at least one of the network information and the terminal information; and the processing of the audio signal comprises processing the audio signal according to a process degree.

42. The computer readable recording medium of claim 41, wherein the processing of the audio signal comprises:

checking the type of the audio signal;

determining the process degree using the checked result and the table; and processing the audio signal according to the determined process degree.

43. The computer readable recording medium of claim 37, wherein:

the data selecting process includes selecting some of data included in the audio signal, and the band reducing process includes discarding a high frequency component of the audio signal, according to at least one of the network information and the terminal information.

* * * * *